United States Patent
Hatanaka et al.

(10) Patent No.: US 9,606,632 B2
(45) Date of Patent: Mar. 28, 2017

(54) OPERATION INPUT DEVICE

(71) Applicant: DENSO CORPORATION, Kariya, Aichi-pref. (JP)

(72) Inventors: Shinji Hatanaka, Okazaki (JP); Shigeaki Nishihashi, Nagoya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 214 days.

(21) Appl. No.: 14/423,985

(22) PCT Filed: Aug. 23, 2013

(86) PCT No.: PCT/JP2013/004991
§ 371 (c)(1),
(2) Date: Feb. 25, 2015

(87) PCT Pub. No.: WO2014/034067
PCT Pub. Date: Mar. 6, 2014

(65) Prior Publication Data
US 2015/0212589 A1  Jul. 30, 2015

(30) Foreign Application Priority Data

Aug. 31, 2012  (JP) ................................ 2012-191934

(51) Int. Cl.
*G06F 3/02*  (2006.01)
*G06F 3/0354*  (2013.01)
(Continued)

(52) U.S. Cl.
CPC ............. *G06F 3/0227* (2013.01); *G01B 5/30* (2013.01); *G06F 1/169* (2013.01); *G06F 3/038* (2013.01);
(Continued)

(58) Field of Classification Search
CPC ......... G01B 5/30; G06F 1/169; G06F 3/0354; G06F 3/03547; G06F 3/038; G06F 3/0414
(Continued)

(56) References Cited

U.S. PATENT DOCUMENTS 4,362,408 A * 12/1982 Cordes .................. H01H 13/50
341/27
5,241,308 A * 8/1993 Young ................... G06F 3/0414
341/22

(Continued)

FOREIGN PATENT DOCUMENTS

EP  2042975 A1  4/2009
JP  H11297152 A  10/1999
(Continued)

OTHER PUBLICATIONS

International Search Report and Written Opinion (in Japanese with English Translation) for PCT/JP2013/004991, mailed Nov. 5, 2013; ISA/JP.

*Primary Examiner* — Temesghen Ghebretinsae
*Assistant Examiner* — Benyam Ketema
(74) *Attorney, Agent, or Firm* — Harness,Dickey & Pierce, P.L.C.

(57) ABSTRACT

An operation input device includes an operation body, a case holding the operation body, and at least three flexible bodies. The operation body includes an operation body movable part and a movable part driver. The operation body movable part has a touch surface having a predetermined touch surface region. The movable part driver causes the operation body movable part to move a touch surface position where the touch surface region is flush with a remaining region of the touch surface and a button position located above or below the touch surface position. Each flexible body is connected at one end to an outer edge of the operation body, connected (Continued)

at the other end to the case, and has a displacement-transmitting surface capable of being displaced according to a pressing operation force applied to the operation body by a pressing operation to the touch surface.

15 Claims, 27 Drawing Sheets

(51) Int. Cl.
  *G06F 3/041*  (2006.01)
  *G01B 5/30*  (2006.01)
  *G06F 1/16*  (2006.01)
  *G06F 3/038*  (2013.01)

(52) U.S. Cl.
  CPC ........ *G06F 3/0354* (2013.01); *G06F 3/03547* (2013.01); *G06F 3/0414* (2013.01)

(58) Field of Classification Search
  USPC .......................................................... 345/173
  See application file for complete search history.

(56) References Cited

U.S. PATENT DOCUMENTS

| | | | | |
|---|---|---|---|---|
| 8,199,124 | B2* | 6/2012 | Ciesla | G06F 3/0202 |
| | | | | 178/18.01 |
| 8,243,038 | B2* | 8/2012 | Ciesla | G06F 3/016 |
| | | | | 178/18.01 |
| 2002/0149561 | A1* | 10/2002 | Fukumoto | G01C 21/3664 |
| | | | | 345/156 |
| 2005/0035047 | A1 | 2/2005 | Colby et al. | |
| 2005/0179565 | A1 | 8/2005 | Mase et al. | |
| 2007/0152982 | A1* | 7/2007 | Kim | G06F 3/016 |
| | | | | 345/173 |
| 2008/0019502 | A1* | 1/2008 | Emmert | H04M 1/026 |
| | | | | 379/433.07 |
| 2010/0245231 | A1* | 9/2010 | Aramaki | G06F 3/02 |
| | | | | 345/156 |
| 2011/0102358 | A1 | 5/2011 | Aono et al. | |
| 2011/0241997 | A1* | 10/2011 | Yang | G06F 3/0213 |
| | | | | 345/168 |
| 2012/0055268 | A1* | 3/2012 | Hatanaka | G06F 3/0414 |
| | | | | 73/862.621 |
| 2015/0106051 | A1* | 4/2015 | Hatanaka | G06F 3/0414 |
| | | | | 702/150 |

FOREIGN PATENT DOCUMENTS

| | | |
|---|---|---|
| JP | 2000162962 A | 6/2000 |
| JP | 2000287284 A | 10/2000 |
| JP | 2002149312 A | 5/2002 |
| JP | 2005135876 A | 5/2005 |
| JP | 2006047538 A | 2/2006 |
| JP | 2006252093 A | 9/2006 |
| JP | 2009087351 A | 4/2009 |
| JP | 2009154159 A | 7/2009 |
| JP | 2010041860 A | 2/2010 |
| JP | 4633166 B2 | 2/2011 |
| JP | 2012053806 A | 3/2012 |
| JP | 2012058967 A | 3/2012 |

* cited by examiner

FIG. 23
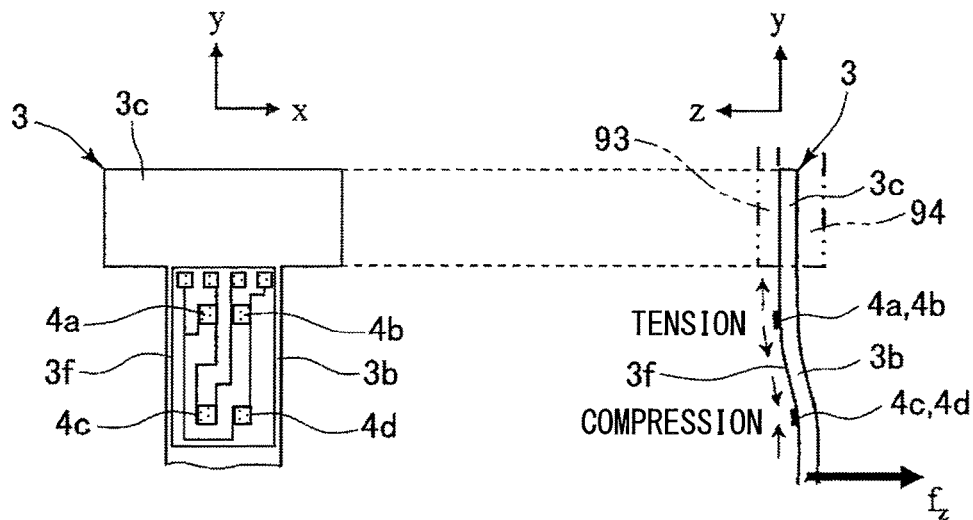
FIG. 24A
| ELEMENT | RESISTANCE CHANGE |
|---|---|
| 4a | INCREASE |
| 4b | INCREASE |
| 4c | DECREASE |
| 4d | DECREASE |
FIG. 24B
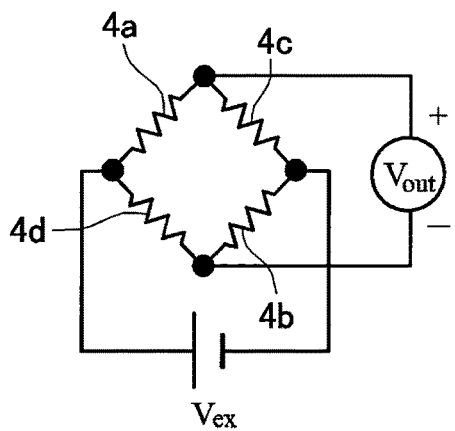

OPERATION INPUT DEVICE

CROSS REFERENCE TO RELATED APPLICATIONS

This application is a U.S. National Phase Application under 35 U.S.C. 371 of International Application No. PCT/JP2013/004991 filed on Aug. 23, 2013 and published in Japanese as WO 2014/034067 A1 on Mar. 6, 2014. This disclosure is based on and claims the benefit of priority from Japanese Patent Application No. 2012-191934 filed on Aug. 31, 2012. The entire disclosures of all of the above applications are incorporated herein by reference.

TECHNICAL FIELD

This disclosure relates to an operation input device.

BACKGROUND ART

An operation input device, such as a touchpad, having a touch surface has a high degree of flexibility in operation (patent literature 1) because it is capable of being operated by various types of input operations including a flick operation and a trace operation. On the other hand, an operation input device having a push switch is capable of being operated by a simple operation such as pushing a switch arranged in a fixed position.

PRIOR ART LITERATURES

Patent Literature

Patent Literature 1: JP 2012-53806A

SUMMARY OF INVENTION

To achieve the advantages of both the touchpad and the push switch, there is a need to add them to an operation input device. In this case, it is configured so that the touchpad and the push switch can be separately used depending on a type of content displayed on a display screen. Hoverer, if one of the touch pad and the push switch is less frequently used, it is preferable from a space-saving perspective that the less frequently used one should be omitted despite the degradation in operability. In particular, in an operation input device for a vehicle, a needless switch such as that described above should be omitted to the extent possible because there is only a limited space for switches.

It is an object of the present disclosure to provide an operation input device capable of achieving advantages of both touchpad and push switch.

According to an aspect of the present disclosure, an operation input device includes an operation body having an operation body movable part and a movable part driver, a case holding the operation body, at least three flexible bodies, each having a connector at one end, a fixing portion at the other end, and a middle portion between the connector and the fixing portion, a strain gauges, and calculation means. The operation body movable part has a touch surface to which a use applies a pressing operation. The touch surface has a predetermined touch surface region. The movable part driver causes the operation body movable part to move a touch surface position where the touch surface region is flush with a remaining region of the touch surface and a button position located above or below the touch surface position. The connector is connected to an outer edge of the operation body. The fixing portion is connected to the case. The middle portion has a displacement-transmitting surface capable of being displaced according to a pressing operation force applied to the operation body by the pressing operation to the touch surface. Each strain gauge is fixed to the displacement-transmitting surface of a corresponding flexible body to detect distortion of the displacement-transmitting surface caused by displacement of the flexible body. When the pressing operation is applied to the touch surface except the touch surface region of the operation body movable part in the button position, the calculation means is capable of calculating a position and force of the pressing operation force. When the pressing operation is applied to the touch surface region of the operation body movable part in the button position, the calculation means is capable of determining presence or absence of the pressing operation.

According to the structure of the present disclosure, at least three flexible bodies are provided as a supporting member for supporting the operation body. When the pressing operation (touch operation) is applied to the touch surface of the operation body, the pressing force is transmitted to each flexible body and detected as distortion, and the position and force of the pressing operation to the touch surface can be calculated based on the detected distortion. Further, since a region of the touch surface is raised (moves up) or sinks (moves down), the touch surface can be used not only like a touch pad but also like a push button (push switch). Further, like the pressing operation to the touch surface, the presence or absence of the pressing operation (push operation) to the push button can be determined based on the detected distortion of the flexible body. Therefore, there is no need of an operation detector designed for a push button. In a conventional resistive or capacitive touch pad, it is impossible to cause a region to be raised or sink.

Further, in the structure of the present disclosure, the plate-shaped displacement-transmitting surface where the strain gauge is placed can be located on almost the same plane as the plate-shaped touch surface. According to this structure, the detection result of the strain gauge has little sensibility except in the direction perpendicular to the touch surface and thus reflects force in the direction perpendicular to the touch surface. Therefore, the center of gravity of force applied to the touch surface can be detected accurately.

It is noted that a button surface of the push button formed when the touch surface is raised (moves up) or sinks (moves down) cannot be located on almost the same surface as the displacement-transmitting surface. However, when the pressing operation to the button surface is supported by the operation body having the touch surface, the presence or absence of the pressing operation to the push button can be detected based on the detection result of the distortion of the flexible body. That is, since a position of the push button, which is formed when the touch surface is raised (moves up) or sinks (moves down), is fixed in the touch surface, the detection result of the distortion of the flexible body caused when the pressing operation is applied to the push button can have a certain trend (position displacement). For this reason, when the push button is formed, it can be determined that the pressing operation is applied to the push button when the detection result of the distortion marches the trend.

In a structure where multiple push buttons are formed, when a supporting surface of the operation body for supporting the pressing force of the pressing operation to each push button is located on the same plane as the touch surface, the detection results of the distortions caused by the pressing operation to each push button have a common trend. Thus, it is easy to determine the present or absence of the operation. Further, in this case, by reducing a difference between the touch surface position and the button position, like the pressing operation to the touch surface, the presence or absence of the operation to the push button can be determined based on the detection result of the distortion even if the push button is formed when the touch surface is raised (moves up) or sinks (moves down).

BRIEF DESCRIPTION OF THE DRAWINGS

The above and other objects, features and advantages of the present disclosure will become more apparent from the following detailed description made with reference to the accompanying drawings. In the drawings:

FIG. 23 illustrates the flexible body and a strain gauge viewed from above and illustrates the flexible body viewed from a side surface and showing stress applied to a displacement-transmitting surface of the flexible body when the pressing operation force is applied in a direction perpendicular to the touch surface;

FIG. 24A is a table showing detection results of the strain gauge observed when the pressing operation force is applied in the direction perpendicular to the touch surface;

FIG. 24B is a circuit diagram showing an equivalent circuit of the strain gauge shown in FIG. 24A;

EMBODIMENTS FOR CARRYING OUT INVENTION

Below, embodiments of an operation input device according to the present disclosure are described with reference to the drawings.

First Embodiment

Figure 1:
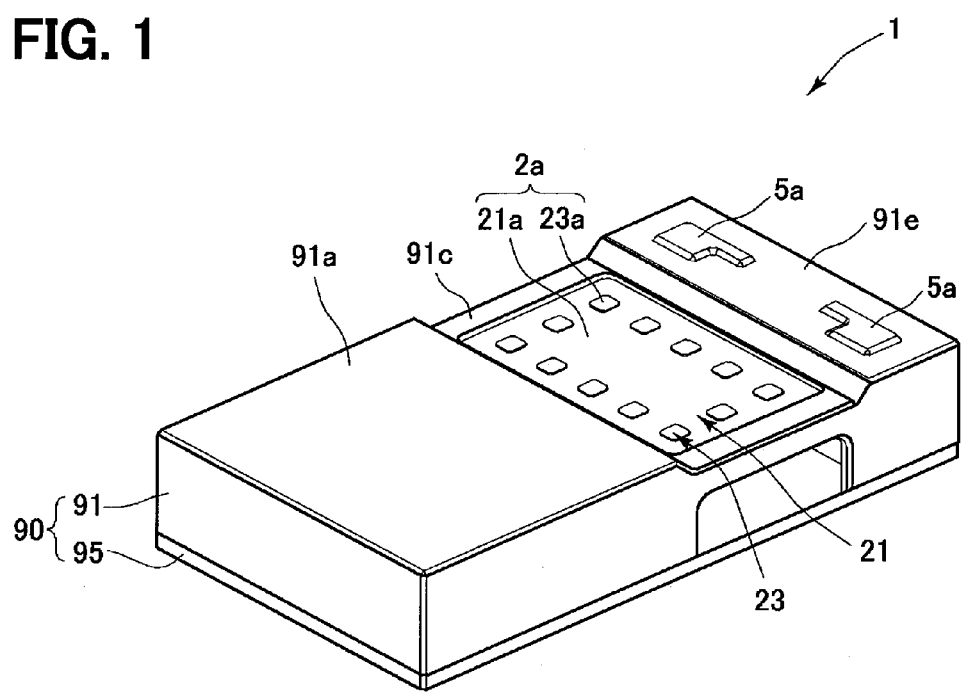
FIG. 1 is an outline view of an operation input device according to a first embodiment of the present disclosure.
Figure 2:
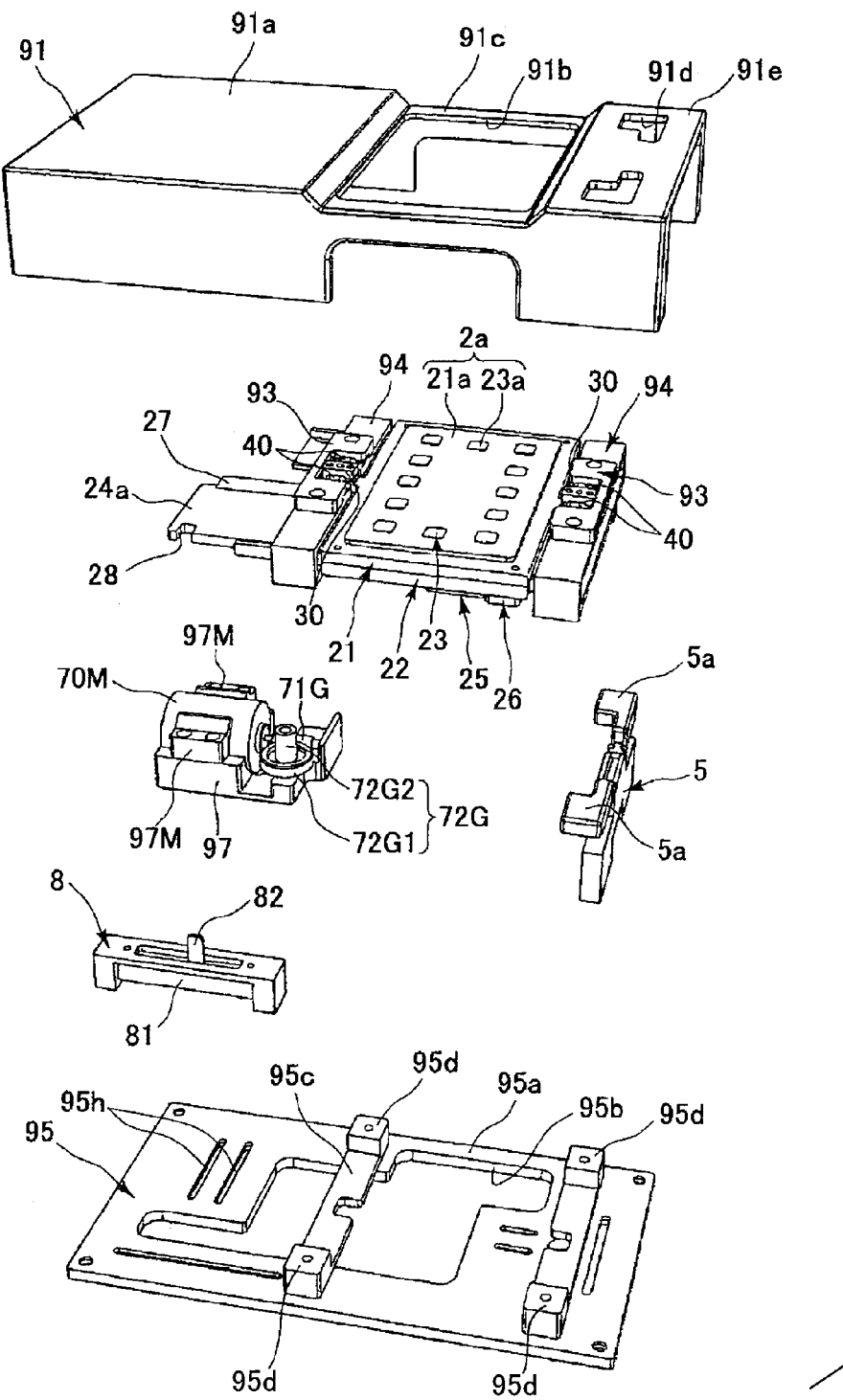
FIG. 2 is an exploded, perspective view of the operation input device shown in FIG. 1.
Figure 3:
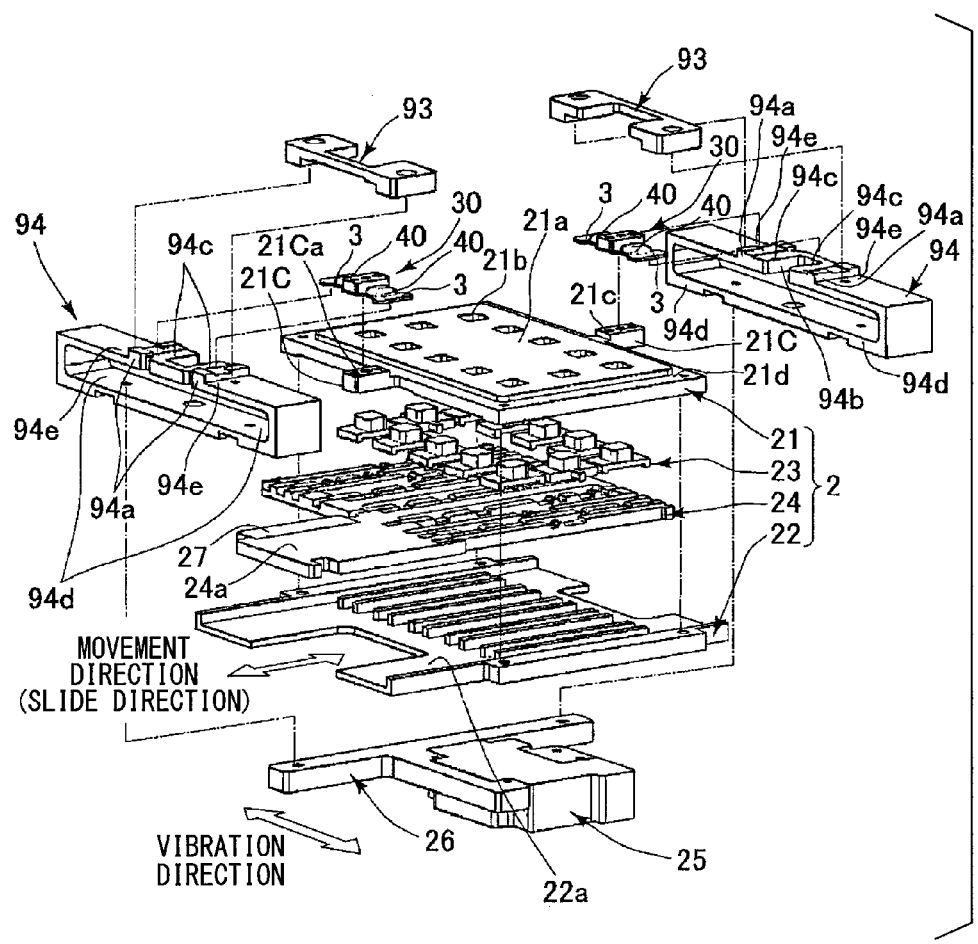
FIG. 3 is an exploded, perspective view showing structures of an operation body and a flexible body shown in FIG. 2.
Figure 4:
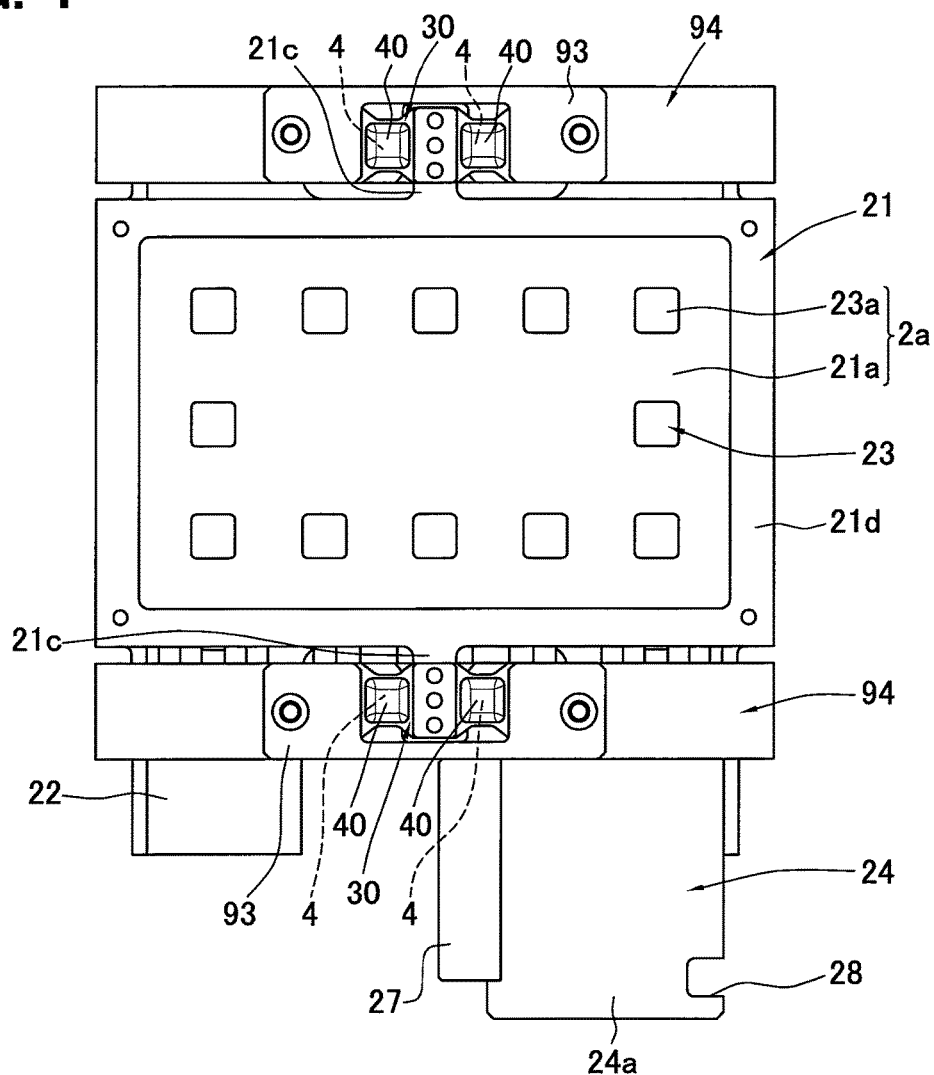
FIG. 4 is a top view of the operation body and a supporting member shown in FIG. 2.

An operation input device 1 according to a first embodiment of the present disclosure is shown in FIGS. 1-3 and includes an operation body 2 having a touch surface 2a to which a press operation is applied by a user, a case (housing) 90 for holding the operation body 2, at least three flexible bodies 3 (refer to FIG. 27), strain gauges 4, and a signal processor (calculating means and operation information outputting means) 6. Each flexible body 3 has a first end provided with a connector 21C to be connected to an outer edge of the operation body 2, a second end provided with a fixing portion 3d to be fixed to the case 90, and a middle portion 3b having a displacement-transmitting surface 3f between the connector 21C and the fixing portion 3d. The displacement-transmitting surface 3f is displaced according to pressing operation force applied to the operation body 2 by the press operation applied to the touch surface 2a. Each strain gauge 4 is fixed to the displacement-transmitting surface 3f of the flexible body 3 and detects distortion of the displacement-transmitting surface 3f caused by the displacement of the flexible body 3. The signal processor 6 calculates a position and force of the pressing operation force applied to the touch surface 2a based on the distortion detected by each strain gauge 4 and outputs the calculation result.

In the operation input device 1 according to the present embodiment, the operation body 2, a supporting member 94, the flexible bodies 3, the strain gauges 4, and the signal processor 6 are held in the case 90. The supporting member 94 supports the operation body 2 around the operation body 2. The flexible bodies 3 join the operation body 2 to the supporting member 94 at three or more positions around the operation body 2 and are elastically deformed and displaced at their respective joint portions by an oblique displacement of the operation body 2 according to the position and force of the press operation (touch operation) applied to the touch surface 2a. Each strain gauge 4 is placed on the displacement-transmitting surface 3f of a corresponding flexible body 3 and detects the distortion of the displacement-transmitting surface 3f caused by the oblique displacement of the operation body 2.

As shown in FIGS. 1 and 2, a top cover 91, a bottom cover 95, and the supporting member 94 are assembled into the case 90 so that the case 90 can have an accommodation space inside. The top cover 91 is intended for upkeep of strength, dust prevention, or upkeep of design of the operation input device 1. According to the present embodiment, the top cover 91 is fixed to the bottom cover 95 by a fastener such as a screw.

The upper cover 91 has openings 91b and 91d. The operation body 2 is placed in the opening 91b, and a push button 5a is placed in the opening 91d. A top surface of the top cover 91 has main surfaces 91a and 91e, and a recessed surface 91c recessed relative to the main surfaces 91a and 91e. Two openings 91d are formed in the main surface 91e. The opening 91b is larger than the opening 91d and formed in the recessed surface 91c.

Figure 8:
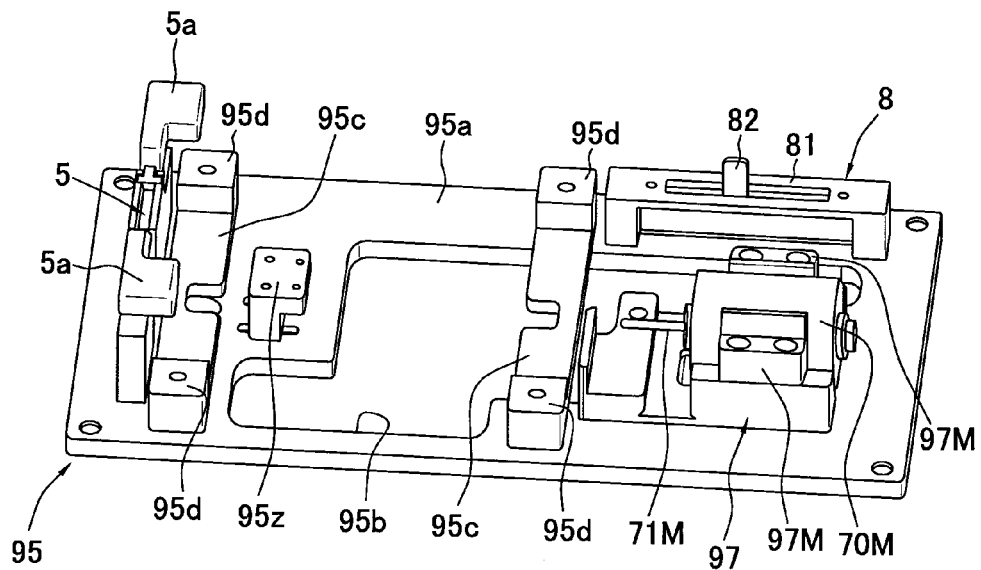
FIG. 8 is a perspective view of a bottom cover and a part assembled with it.
Figure 9:
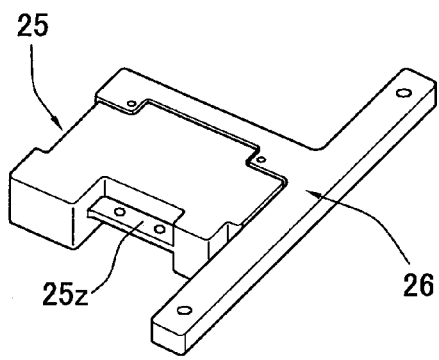
FIG. 9 is a perspective view of an operational feeling generator assembled with the operation body shown in FIG. 2.

As shown in FIG. 8, the bottom cover 95 has a bottom plate 95a and two bottom supporting members 95c. The bottom plate 95a has a center opening 95b for ventilation. The bottom supporting member 95c crosses over the center opening 95b. The bottom supporting member 95c is fixed to an outer region of the bottom plate 95a by a fastener such as a screw.

The supporting member 94 is fixed to the bottom cover 95 by a fastener such as a screw. Here, both ends of the two bottom supporting members 95c project upward, and the supporting member 94 is placed on end surfaces 95d of the bottom supporting member 95c and fixed by a fastener such as a screw.

Figure 5:
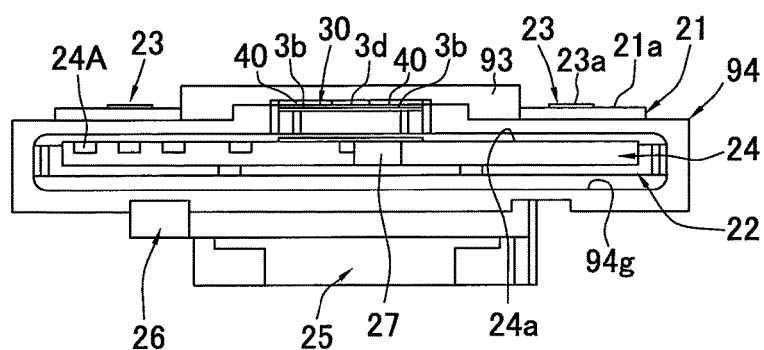
FIG. 5 is a front view of the operation body and the supporting member shown in FIG. 2.

As shown in FIG. 2 and FIG. 5, the operation body 2 is supported through the flexible body 3 by the supporting member 94 on the bottom cover 95 and spaced from other components on the case 90 side.

Further, the touch surface 2a of the operation body 2 is exposed through the opening 91b of the top cover 91 so that a user can apply a touch operation to the touch surface 2a. Thus, the operation body 2 can be used as a touch panel or touchpad. Here, the touch surface 2a is a flat surface facing upward. As shown in FIGS. 2-5, the operation body 2 has multiple operation-body-side connectors 21C which connect the touch surface 2a to the supporting member 94 so that the pressing operation force applied to the touch surface 2a (including a touch surface region 23a described later) can be supported by the supporting member 94 through the flexible body 3.

As shown in FIG. 3, each operation-body-side connector 21C projects outwardly from an outer edge of an operation plate 21. Here, a pair of operation-body-side connectors 21C faces with each other across the touch surface 2a. At least one pair of operation-body-side connectors 21C can be included, and only one pair is included here. According to the present embodiment, a x-y coordinate system is defined such that its origin is at the center of the rectangular touch surface 2a. The pair of operation-body-side connectors 21C is located across the touch surface 2a from each other and project in a direction along the x-axis direction.

According to the present embodiment, the operation plate 21 has a projection end surface 21a and a stepped lower surface 21d. The projection end surface 21a projects upward in a rectangular manner at the center of the operation plate 21. The stepped lower surface 21d is located around the projection end surface 21a at a level lower by one step than a level where the projection end surface 21a is located. The operation-body-side connector 21C projects outwardly from an outer region of the operation plate 21 where the stepped lower surface 21d is formed. The operation-body-side connector 21C is thickened upwardly so that a top surface 21c (a connection surface to the flexible body 3: Here, it is a surface on which the flexible body 3 is placed) of the projection end of the operation-body-side connector 21C can be located at the same level as the touch surface 2a (Here, it represents a remaining region 21a except an exposed surface 23a of the operation body movable part 23 in a touch surface position described later and an opening 21b of the touch surface 2a).

Figure 21A:
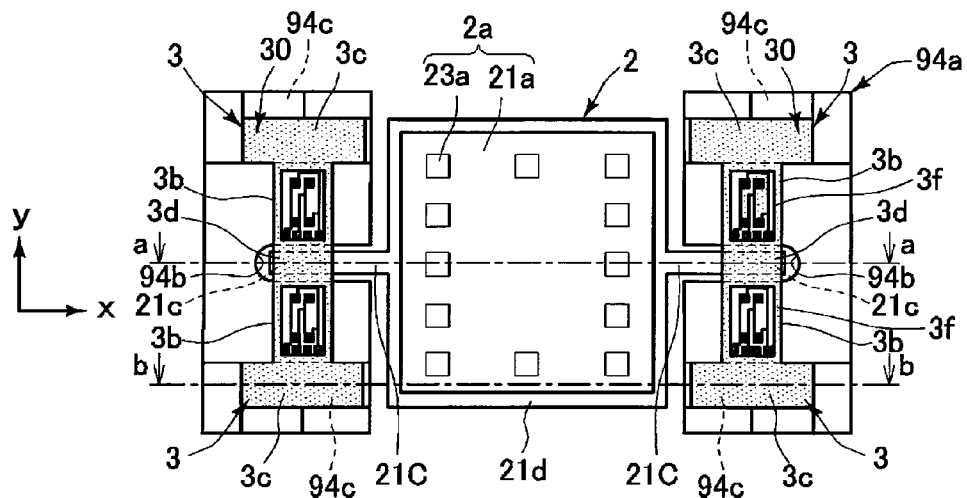
FIG. 21A is a simplified top view showing a condition where the flexible body is placed on the operation body and the supporting member shown in FIG. 2.
Figure 21B:
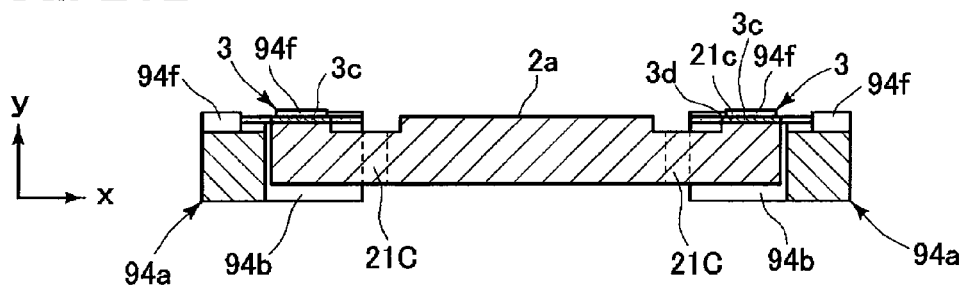
FIG. 21B is a cross-sectional view of FIG. 21A taken along a line a-a.
Figure 21C:
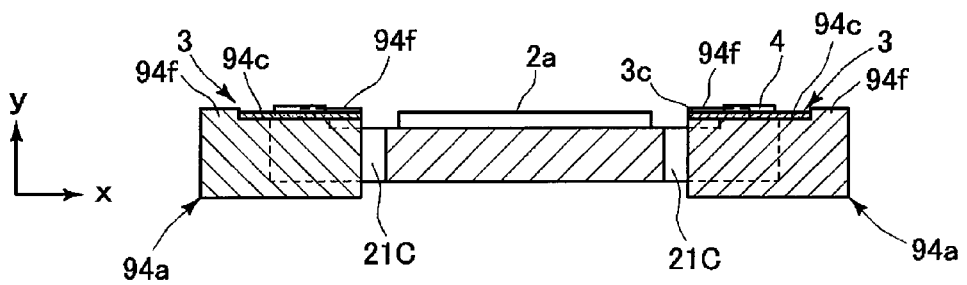
FIG. 21C is a cross-sectional view of FIG. 21A taken along a line b-b.

As shown in FIGS. 21A-21C, the flexible body 3 is a plate-shaped member and has a first end provided with a flexible-body-side connector 3d to be connected to an outer edge (here, the operation-body-side connector 21C) of the operation body 2, a second end provided with a flexible-body-side fixing portion 3c to be fixed to the case 90 side (here, the supporting member 94), and the flexible-body middle portion 3b having the displacement-transmitting surface 3f between the connector 3d and the fixing portion 3c. The displacement-transmitting surface 3f is displaced according to the pressing operation force caused by the press operation (touch operation) applied to the touch surface 2a.

According to the present embodiment, the flexible-body middle portion 3b extends in parallel to the touch surface 2a from a connection portion (i.e., the connector 3d) between the flexible body 3 and the operation-body-side connector 21C. The flexible-body middle portion 3b is an elastically deformable member (here, thin plate) and capable of being elastically deformed or bent according to the pressing operation force applied to the touch surface 2a. A front surface (top surface) of the flexible-body middle portion 3b serves as the displacement-transmitting surface 3f.

Thus, according to the present embodiment, out of an operation displacement occurring in the operation body 2 in a vertical direction z perpendicular to the touch surface 2a according to an operation force Fz (corresponding to fx1+fz2 in FIG. 26A) caused by the pressing force applied to the touch surface 2a, a displacement reflecting an operation displacement occurring on a side where it (3f) is located occurs in the vertical direction z. The strain gauge 4 (covered and protected with a protector 40 made of resin, for example) on the displacement-transmitting surface 3f detects the amount of the elastic deformation in the vertical direction z as a distortion caused by expansion and contraction of the displacement-transmitting surface 3f. At least three displacement-transmitting surfaces 3f are provided around the operation body 2. Here, four displacement-transmitting surfaces 3f are provided.

According to the present embodiment, as shown in FIG. 21B and FIG. 21C, all the displacement-transmitting surfaces 3f are located on the same plane as the touch surface 2a. Thus, a center position (i.e., operation position (x1, y1)) of the operation force perpendicularly applied to the touch surface 2a can be calculated easily from formulas (1-1) to (1-5) which are described later.

Further, according to the present embodiment, as shown in FIG. 21A, two flexible bodies 3 are located across one operation-body-side connector 21C from each other. The two flexible bodies 3 can be provided as separate pieces. Here, the two flexible bodies 3 are integrated as a single flexible body 3 and share one flexible-body-side connector 3d. The flexible-body middle portion 3b extends from each side of the flexible-body-side connector 3d so that of each flexible body 3 can have the flexible-body middle portion 3b. Further, the flexible-body-side fixing portion 3c is formed at an end of the flexible-body middle portion 3b.

As shown in FIG. 21B, the flexible-body-side connector 3d is in contact with the top surface 21c of the operation-body-side connector 21C of the operation body 2 and fixed (connected) to the connector 21C by a screw, an adhesive, etc. On the other hand, the flexible-body-side fixing portion 3c is placed on a predetermined mount surface 94c of the supporting member 94 as shown in FIG. 21C and pressed from above by a pressing member 93 as shown in FIG. 5 so that it can be sandwiched vertically and held. Specifically, the flexible-body-side fixing portion 3c placed on the mount surface 94c is positioned by a positioning part 94f which projects upwardly outside the mount surface 94c of the supporting member 94. Further, the flexible-body middle portion 3b, which is located between the flexible-body-side connector 3d and the flexible-body-side fixing portion 3c, bridges from the operation-body-side connector 21C of the operation body 2 to the mount surface 94c of the supporting member 94 in such a manner that a space can be formed under the flexible-body middle portion 3b.

As shown in FIG. 5, the pressing member 93 is fixed to the supporting member 94 by a fastener such as a screw so that the flexible body 3 (here, a flexible body member 30) can be vertically sandwiched. Specifically, the pressing member 93 comes into contact with a mount-portion peripheral part 94e of the supporting member 94 by passing round a mount portion 94a and is fixed to the mount-portion peripheral part 94e by a fastener such as a screw. The mount portion 94a projects upward in the supporting member 94 so that it can have the mount surface 94c for the flexible-body-side fixing portion 3c.

As shown in FIG. 21A and FIG. 21B, the supporting member 94 has a recess portion 94b. The recess portion 94b is located near the operation-body-side connector 21C which is located on each end side of the operation body 2. The recess portion 94b is receded to form an opening facing the operation body 2. The operation-body-side connector 21C is received in the recess portion 94b in a contactless manner, and the flexible body 3 (here, the flexible body member 30) bridges from the received operation-body-side connector 21C to the mount surface 94c of the supporting member 94.

Figure 6:
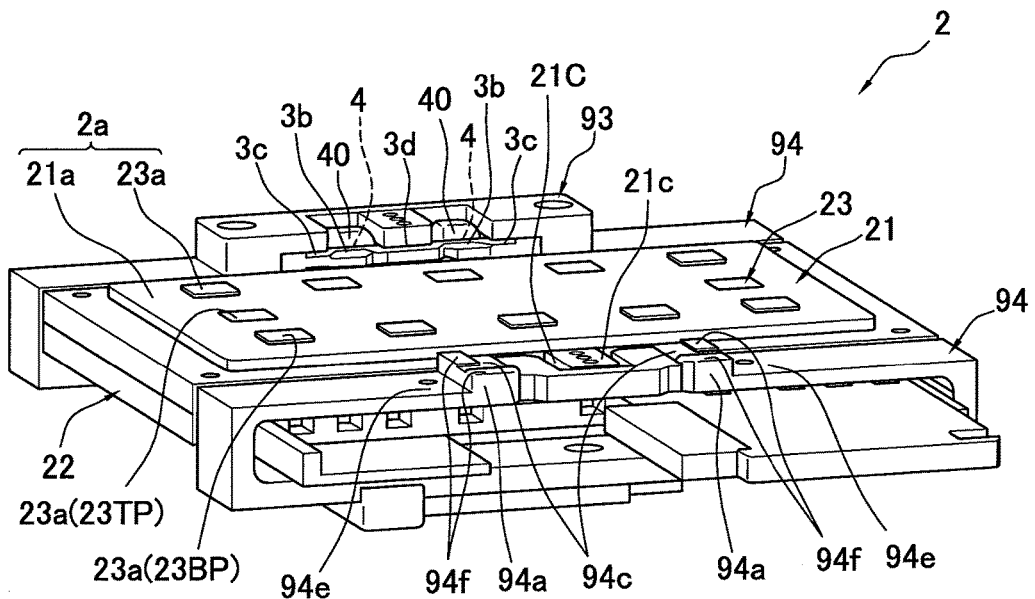
FIG. 6 is a perspective view of the operation body and the supporting member shown in FIG. 2 from above, in which a press member and the flexible body are detached.
Figure 7:
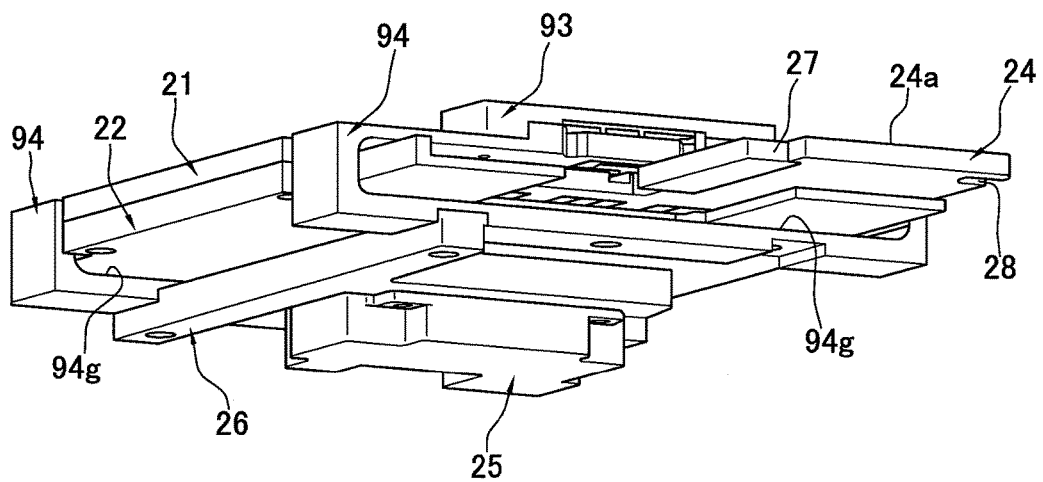
FIG. 7 is a perspective view of the operation body and the supporting member shown in FIG. 2 from below.

As shown in FIG. 3, according to the present embodiment, the supporting member 94 is a ring-shaped member and has a through hole 94g extending from the operation body 2 side in its opposite (outward) direction. As shown in FIGS. 5-7, the mount portion 94a having the mount surface 94c is formed in the center of a top surface of the ring-shaped member 94. On the other hand, a fixing member 94d to be fixed to the bottom cover 95 (the bottom supporting member 95c) is formed on each end of a bottom surface of the rind-shaped member 94. Further, as shown in FIG. 6 and FIG. 7, the operation body 2 is partially received in the through hole 94g in a contactless manner with a hole inner surface.

By the way, according to the present disclosure, the operation body 2 can have not only the touch surface 2a, but also a push button in the touch surface 2a.

That is, according to the present disclosure, as shown in FIG. 3, the operation body 2 includes the operation plate (touch surface member) 21, the operation body movable part 23, a movable part driver 24, and an operation-body supporting part 22. The operation plate 21 has the touch surface 2a on its surface. Further, here, an opening 21b is formed in a predetermined region of the touch surface 2a, and the surface 23a of the operation body movable part 23 is exposed through the opening 21b. The touch surface 2a of the operation body 2 can be formed as a flat surface so that the exposed surface 23a can be flush with the remaining region 21a of the touch surface 2a except the opening 21b. It is noted that at least one opening 21b is formed in the touch surface 2a, each opening 21b is a through hole penetrating the operation plate 21 in its thickness direction, and the operation body movable part 23 is located inside the opening 21b.

As shown in FIG. 6, the operation body movable part 23 is movable between a touch surface position 23TP and a button position 23BP. The touch surface position 23TP is where the exposed surface 23a is flush with the remaining region 21a of the touch surface 2a. The button position 23BP is located above (or below) the touch surface position 23TP. The movable part driver 24 causes the operation body movable part 23 to move between the touch surface position 23TP and the button position 23BP. The opening 21b (refer to FIG. 3) of the operation plate 21 serves a guide portion for guiding the movement of the operation body movable part 23.

According to this structure, the exposed surface 23a of the operation body movable part 23 provides a touch surface region 23a. In the touch surface position 23TP, a user can apply a touch operation (press operation) to the touch surface region 23a as part of the touch surface 2a. In the button position 23BP, a user can apply a push operation (press operation) to the touch surface region 23a as a push button. According to the present embodiment, when the press operation is applied to the exposed surface (the touch surface region) 23a of the operation body movable part 23, the pressing operation force is supported by the supporting member 94 through the flexible body 3 and reflected, as a load occurring in the operation body 2, in the distortion detected by each strain gauge 4 regardless of whether the operation body movable part 23 is in the touch surface position 23TP or in the button position 23BP. That is, in the touch surface position 23TP, the position and force of the press operation applied to the touch surface region 23a is calculated based on the distortion detected by each strain gauge 4, and in the button position 23BP, whether or not the press operation is applied to the touch surface region 23a is calculated based on the distortion detected by each strain gauge 4.

Figure 10:
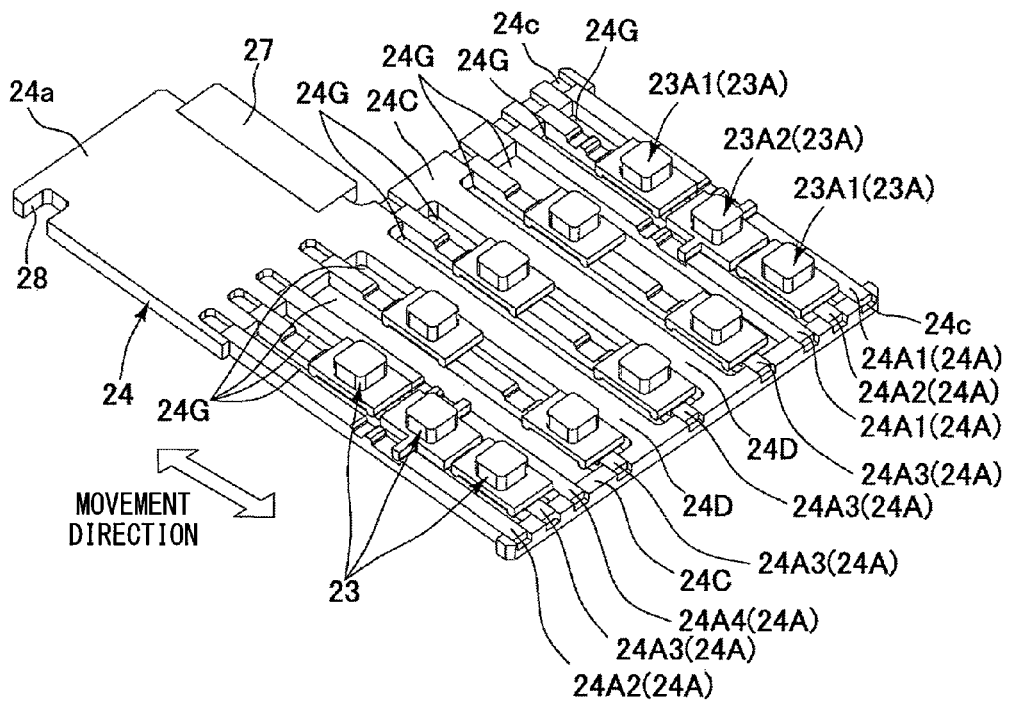
FIG. 10 is a perspective view of a movable part driver where an operation body movable part is placed in the operation body shown in FIG. 2.
Figure 11:
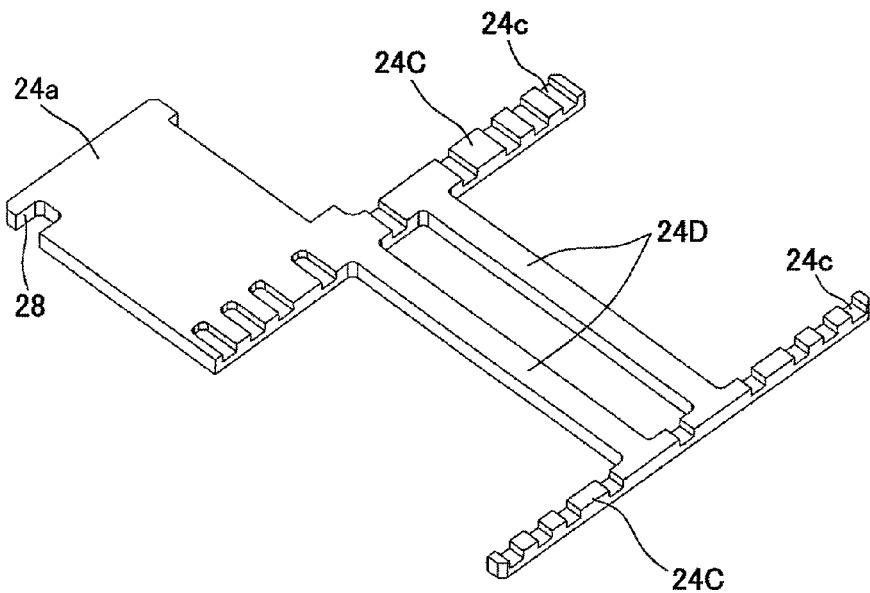
FIG. 11 is a perspective view showing a condition where a cam is removed from the movable part driver shown in FIG. 10.
Figure 12:
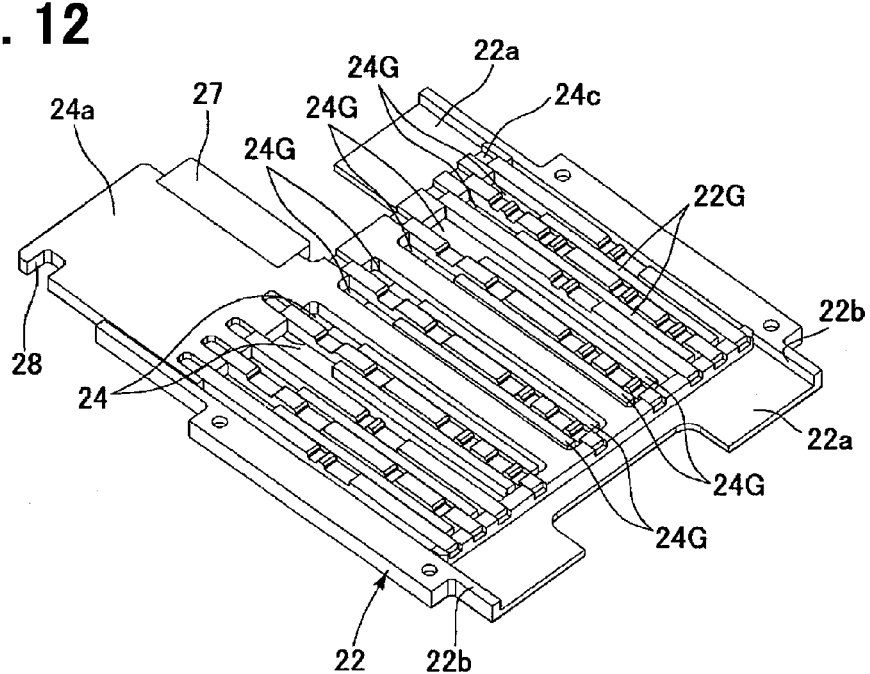
FIG. 12 is a perspective view showing the movable part driver mounted on the operation body supporting member shown in FIG. 2.
Figure 13:
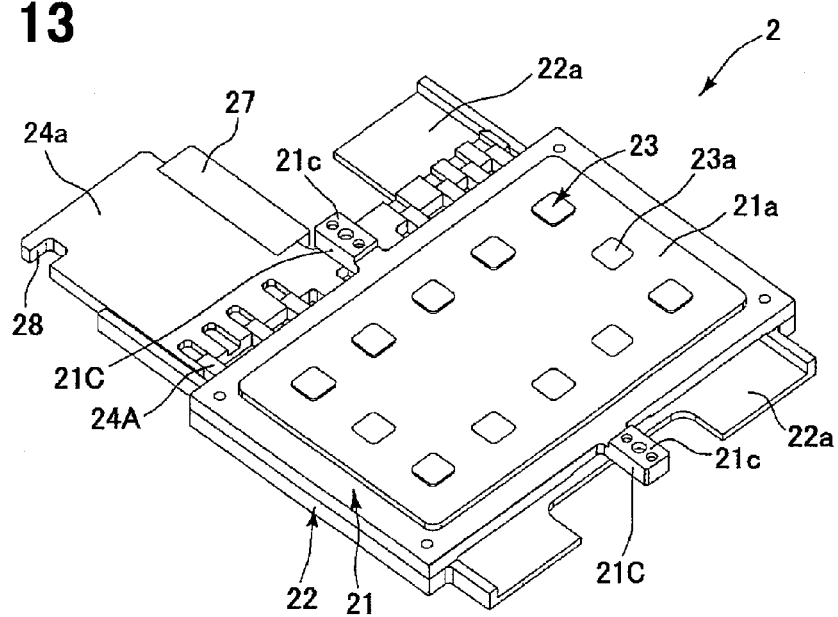
FIG. 13 is a perspective view of the operation body shown in FIG. 2.

The movable part driver 24 causes the operation body movable part 23 to move between the touch surface position 23TP, where the exposed surface (the touch surface region) 23a is flush with the remaining region 21a of the touch surface 2a, and the button position 23BP located above (or below). According to the present embodiment, as shown in FIGS. 10-12, the movable part driver 24 is a cam movable unit 24 having a cam 24A in contact with the operation body movable part 23. The cam movable unit 24 serves as a cam mechanism 24 for causing the operation body movable part 23 to move up and down between the touch surface position 23TP and the button position 23BP by the action of the cam 24A. According to the present embodiment, the cam 24A causes multiple operation body movable parts 23 to move between the touch surface position 23TP and the button position 23BP by moving oneself.

Figure 14A:
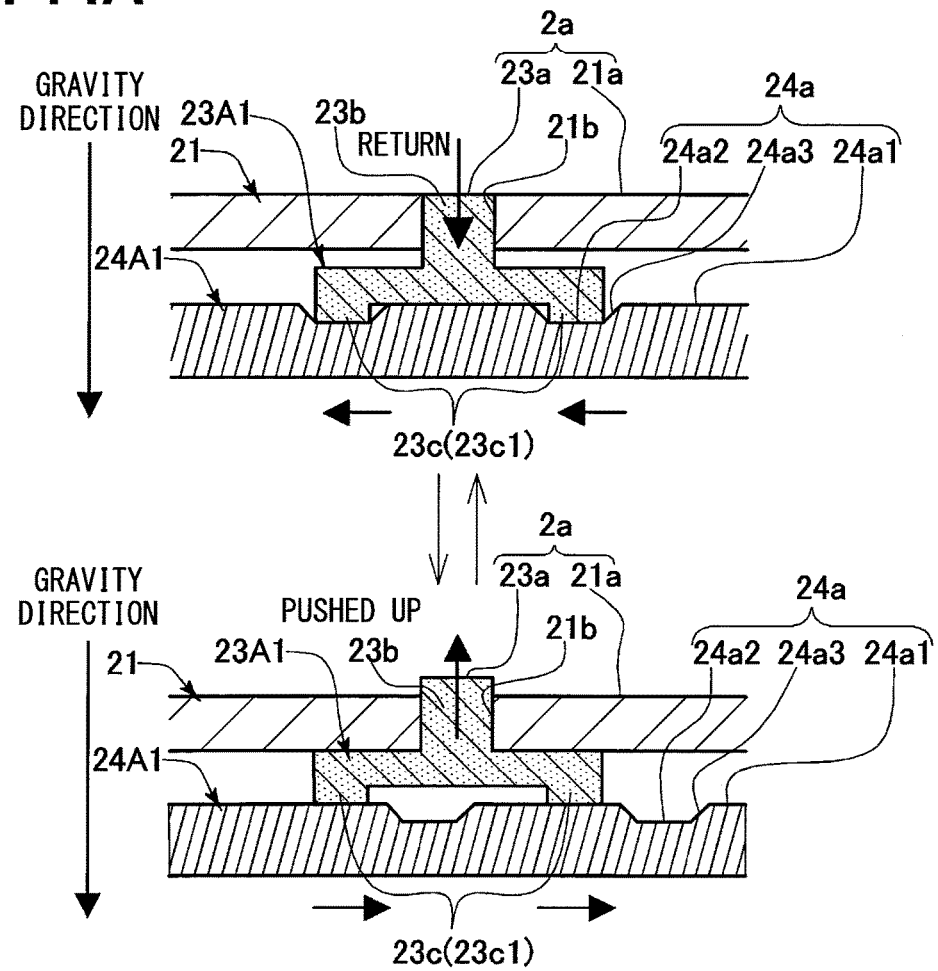
FIG. 14A is a simplified cross-sectional view showing positions of a touch surface and a button of a first operation body movable part.
Figure 15A:
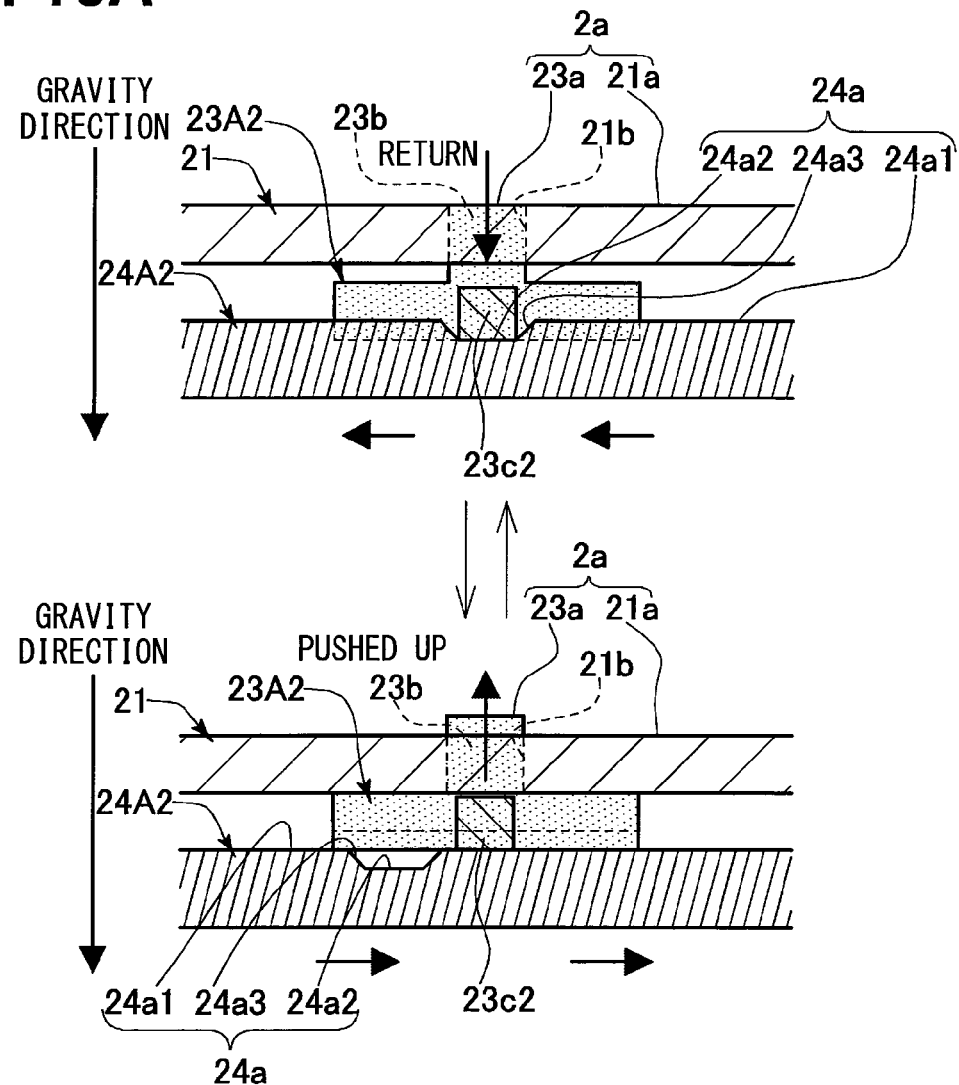
FIG. 15A is a simplified cross-sectional view showing positions of a touch surface and a button of a second operation body movable part.

Further, as shown in FIG. 10 and FIG. 12, multiple operation body movable parts 23 are arranged (mounted) on a cam surface 24a of the cam 24A at different positions in its extension direction and in contact with the cam surface 24a under their own weight. The operation body movable parts 23 move (move relative to the cam 24A) within a movement area of the cam 24A while being in contact with the cam surface 24a. As shown in FIGS. 14A and 15A, a contact section, defined by the movement area of the cam 24A, where each operation body movable part 23 is contact with the cam surface 24a, has a touch surface position section 24a2 for causing the corresponding operation body movable part 23 to be in the touch surface position 23TP and a button position section 24a1 for causing the corresponding operation body movable part 23 to be in the button position 23BP. Further, as a connecting section between the touch surface position section 24a2 and the button position section 24a1, the contact section has a slope section 24a3 for allowing the operation body movable part 23 to move between the touch surface position section 24a2 and the button position section 24a1.

As shown in FIGS. 14A and 15A, the operation body movable part 23 has an upper insertion portion 23b and a lower contact portion 23c. The upper insertion portion 23b is inserted into the opening 21b upwardly. The lower contact portion 23c is located below the upper insertion portion 23b and in contact with the cam surface 24a. The operation body movable part 23 can move smoothly when at least one of a surface of the slope section 24a3 of the cam surface 24a and a surface of the operation body movable part 23 in contact with the cam surface 24a has a smooth curved shape. Here, a surface of the lower contact portion 23c of the operation body movable part 23 in contact with the cam surface 24a is convex downward to form a smooth curved shape.

Figure 15B:
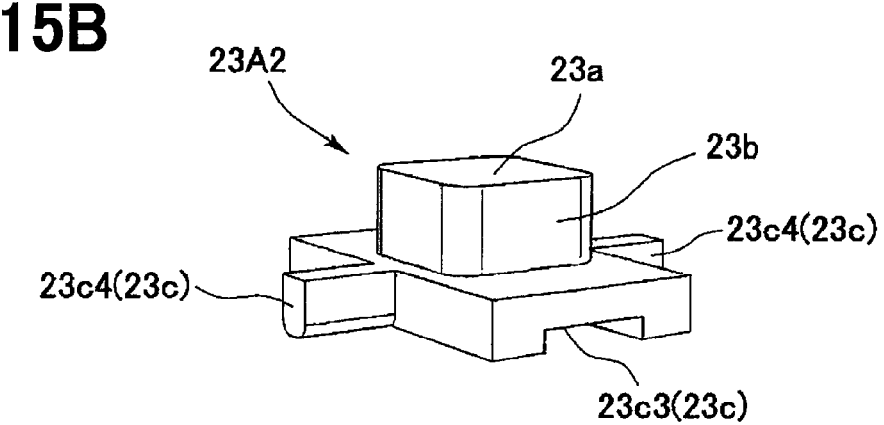
FIG. 15B is a perspective view of the second operation body movable part shown in FIG. 15A.

Further, as shown in FIG. 10, the cam 24A is configured as a cam group of cams 24A to 24A9 which move in an integrated manner. At least one operation body movable part 23 is placed on and in contact with the cam surface 24a of each of the cams 24A1 to 24A9. The integrated movement causes all the operation body movable parts 23 to move individually between the touch surface position 23TP and the button position 23BP. Thus, positions where these cams 24A are stopped are determined within the movement area where multiple cams 24 move in an integrated manner. Therefore, as shown in FIGS. 14A and 15B, it is determined that the contact position of each operation body movable part 23 is in the touch surface position section 24a2 or in the button position section 24a1 on the contact section of the corresponding cam surface 24a. As a result, it is determined that each operation body movable part 23 is in the touch surface position 23TP or in the button position 23BP.

Further, according to the present embodiment, the movement area has multiple predetermined reference stop positions for all the cams 24A1 to 24A9, which move in an integrated manner. All the cams 24A move between the predetermined reference stop positions, so that the operation body movable parts 23 move individually.

Further, as shown in FIG. 10 and FIG. 11, all the cams 24A1 to 24A9, which move in an integrated manner, are fixed to a cam fixing portion 24C so that all the fixed cams 24A can be operated in an integrated manner with the cam fixing portion 24C. According to the present embodiment, both ends of each of the cams 24A, which are operated in an integrated manner, are detachably fitted into grooves 24c of the cam fixing portion 24C. Thus, the cam 24A can be detached and replaced with cam 24A having a different cam surface 24a.

Next, the cam 24A is described in detail.

As shown in FIG. 10, according to the present embodiment, the cam 24A is a straight member having the cam surface 24a extending straight, and at least one operation body movable part 23 is arranged in a straight extension direction of the cam surface 24a and in contact with the cam surface 24a. The operation body 2 further includes guide mechanisms 22G and 24G for allowing the cam 24A to move in the straight extension direction. The guide portions 22G and 24G guide a reciprocating movement of the cam 24A as the straight member in the straight extension direction.

That is, according to the present embodiment, operation-body supporters 22 are provided as a slide supporting body for supporting the movable part driver 24 on a lower side so that it can slide. A guide slit 24G is formed in one of them, and a guide portion 22G to be inserted through the guide slit 24G is formed in the other of them. According to the present embodiment, as shown in FIG. 10, the cams 24A extending in the straight extension direction are arranged laterally on the movable part driver 24, and a slit 24G penetrating up and down and extending in the straight extension direction is provided between adjacent cams 24A and serves as the guide slit 24G. On the other hand, according to the present embodiment, as shown in FIG. 12, multiple projections 22G serving as the guide portions are provided in the operation-body supporter 22. The projection 22G projects upward from a sliding surface 22a where the movable part driver 24 slides into each slit 24G. When the projection 22G inserted through the slit 24G from below is sandwiched between adjacent cams 24A or when the cam 24A is sandwiched between adjacent projections 22G, the movement of the movable part driver 24 is restricted so that it can move only in the straight extension direction (extension direction of the slit 24G).

According to the present embodiment, each slit 24G is provided between adjacent cams 24A, and each projection 22G is inserted through a corresponding slit 24G. Specifically, first ends of the cams 24A are fixed by a first cam fixing portion 24C, second ends opposite to the first ends of the cams 24A are fixed by a second cam fixing portion 24C, and a joint 24D extending in the same direction as the cam 24A joins the first cam fixing portion 24C to the second cam fixing portion 24C. The slit 24G serving as the guide slit 24G is also provided between the joint 24D and the cam 24A, and one of the projections 22G is inserted in the slit 24G. On the other hand, according to the present embodiment, the projection 22G serving as the guide portion has a longitudinal convex shape having a width which allows the projection 22G to be fitted between adjacent cams 24A and having a length which allows the cam 24A to move within the movement area. Further, the operation-body supporter 22 has an outer guide portion 22b which is located at each end of an arrangement direction of the cams 24A perpendicular to the straight extension direction. The whole of the movable part driver 24 is sandwiched by the outer guide portion 22b so that the movement of the movable part driver 24 can be guided in the straight extension direction.

By the way, when multiple operation body movable parts 23 are arranged close to each other in the extension direction of the cam 24A, the contact sections of the operation body movable parts 23 may overlap each other on the cam surface 24a of the cam 24A. In this case, one of the operation body movable parts 23 may accidentally move up and down (move between the touch surface position 23TP and the button position 23BP) in the overlapping contact section. To prevent the overlapping contact section, according to the present embodiment, when multiple operation body movable parts 23 are arranged close to each other in the extension direction of the cam 24A, the cams 24A are arranged laterally so that adjacent operation body movable parts 23 can use different cams 24A which cause up-and-down movement.

According to the present embodiment, out of a lot (here, nine) of cams 24A laterally arranged, three cams 24A located at each end in the lateral arrangement direction are cams 24A where multiple operation body movable parts 23 are arranged close to each other. Out of the three cams 24A, a center cam 24A1 causes an operation body movable part 23A1 to move up and down, and side cams 24A2 cause an operation body movable part 23A2 arranged close to the operation body movable part 23A1 to move up and down. Here, as shown in FIG. 10, three operation body movable parts 23 are arranged close to each other in their movement direction. Out of three cams 24A, each of the center cams 24A2 and 24A5 causes the side operation body movable parts 23A1 to move up and down, and side cams 24A1 and 24A4 cause the operation body movable part 23A2 located in the center to move up and down. In contrast, when a distance between adjacent operation body movable parts 23 is not less than a predetermined value, the adjacent operation body movable parts 23 are caused to move up and down by one cam 24A3.

Further, here, shapes of the operation body movable parts 23A1 and 23A2, which are arranged close to each other, are different from each other.

Figure 14B:
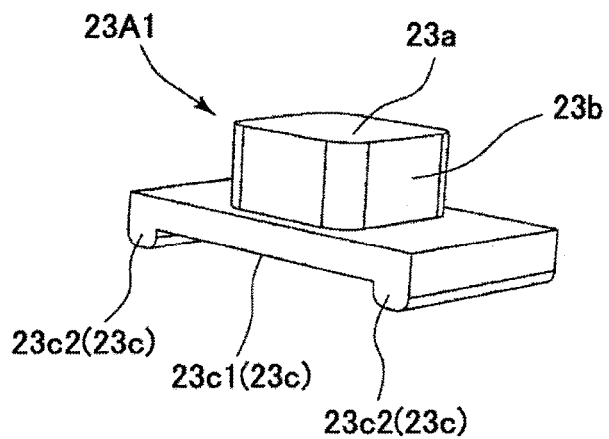
FIG. 14B is a perspective view of the first operation body movable part shown in FIG. 14A.

As shown in FIG. 14A and FIG. 14B, a first operation body movable part 23A1 placed on and in contact with the center cam 24A1 has a lower contact portion 23c in contact with the cam surface 24a. The lower contact portion 23c is located between the side cams 24A2 and includes a lower surface 23c1 and legs 23c2. The lower surface 23c1 faces the cam surface 24a at the center of the movement direction. The leg 23c2 projects downward from the lower surface 23c1 on each side in the movement direction. The first operation body movable part 23A1 is in the button position 23BP when the legs 23c2 are on the convex surface 24a1 of the cam surface 24a. Then, when reaching the slope 24a2, the legs 23c2 slide down the slope 24a2 under its own weight, move down as a whole, and face the concave surface 24a2 of the cam surface 24, so that the first operation body movable part 23A1 is in the touch surface position 23TP. Here, when the first operation body movable part 23A1 (the leg 23c2) slides down the slope 24a2 and moves down as a whole, the lower surface 23c1 comes into contact with the convex surface 24a1 of the cam surface 24a so that the whole can stop moving down under a condition where the leg 23c2 faces the concave surface 24a2 of the cam surface 24a with a clearance between them. Alternatively, in the touch surface position 23TP, the legs 23c2 of the first operation body movable part 23A1 can be in contact with the concave surface 24a2.

As shown in FIGS. 15A and 15B, a second operation body movable part 23A2 placed on and in contact with the side cams 24A2 has a lower contact portion 23c in contact with the cam surface 24a. The lower contact portion 23c is located between the side cams 24A2 and includes a lower surface 23c3 and arms 23c4. The lower surface 23c3 faces the cam surface 24a of the center cam 24A1. The arms 23c4 extend toward the side cams 24A2. Then, when reaching the slope 24a2, the arms 23c4 slide down the slope 24a2 under its own weight, move down as a whole, and face the concave surfaces 24a2 of the cam surfaces 24 of the side cams 24A, so that the second operation body movable part 23A2 is in the touch surface position 23TP. In the touch surface position 23TP, the arms 23c4 of the second operation body movable part 23A2 can be either in contact with or face the concave surfaces 24a2 with a clearance between them. Here, when the second operation body movable part 23A2 (the arms 23c4) slides down the slope 24a2 and moves down as a whole, the lower surface 23c3 comes into contact with the convex surface 24a1 of the center cam 24A so that the whole can stop moving down under a condition where the arms 23c4 face the concave surfaces 24a2 of the cam surfaces 24a with a clearance between them.

According to the present embodiment, the second operation body movable part 23A2 has movement guide portions 23d projecting to hold the center cam 24A1 from both sides. The lower surface 23c3 is formed as a concave surface between the movement guide portions 23d. The arm 23c4 projects from an outer surface of each movement guide portion 23d.

According to the present embodiment, in all of the cams 24A which move in an integrated manner, the touch surface section 24a2 and the button position section 24a1, which are formed in the contact section where each operation body movable part 23 comes in contact with the corresponding cam surface 24a, do not perfectly coincide with each other. The above-described reference stop positions include at least one reference stop position where some of the operation body movable parts 23 are in the operation surface position 23TP, and the others of the operation body movable parts 23 are in the button position 23BP in addition to a reference stop position where all of the operation body movable parts 23 are in the operation surface position 23TP and a reference stop position where all of the operation body movable parts 23 are in the button position 23BP.

Figure 16A:
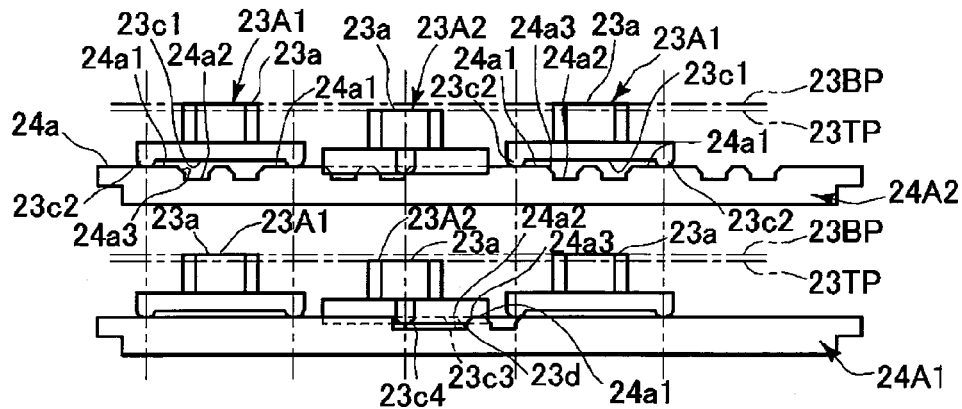
FIG. 16A is a simplified diagram showing a condition where operation body movable parts located close to each other and mounted on adjacent two cams of different types are in a first reference stop position.
Figure 16B:
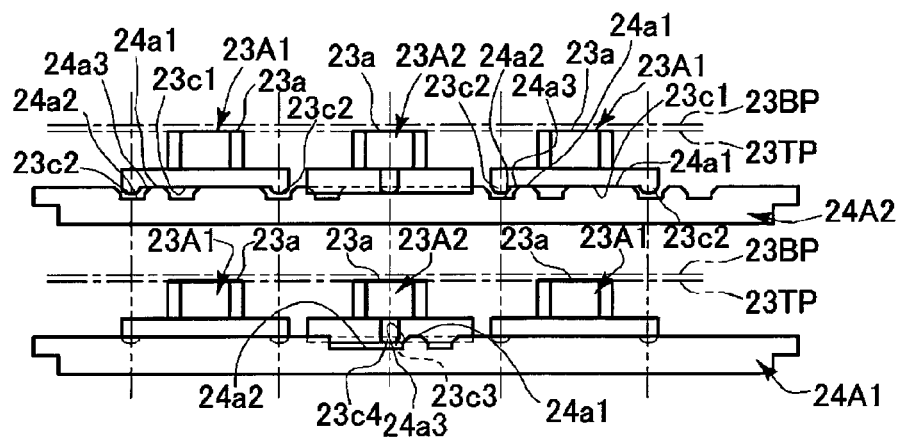
FIG. 16B is a simplified diagram showing a condition where the operation body movable parts shown in FIG. 16A are in a second reference stop position.
Figure 16C:
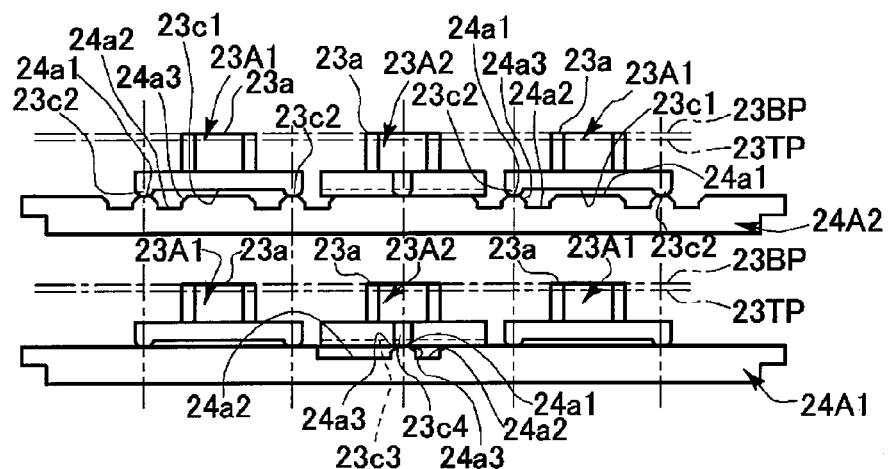
FIG. 16C is a simplified diagram showing a condition where the operation body movable parts shown in FIG. 16A are in a third reference stop position.
Figure 16D:
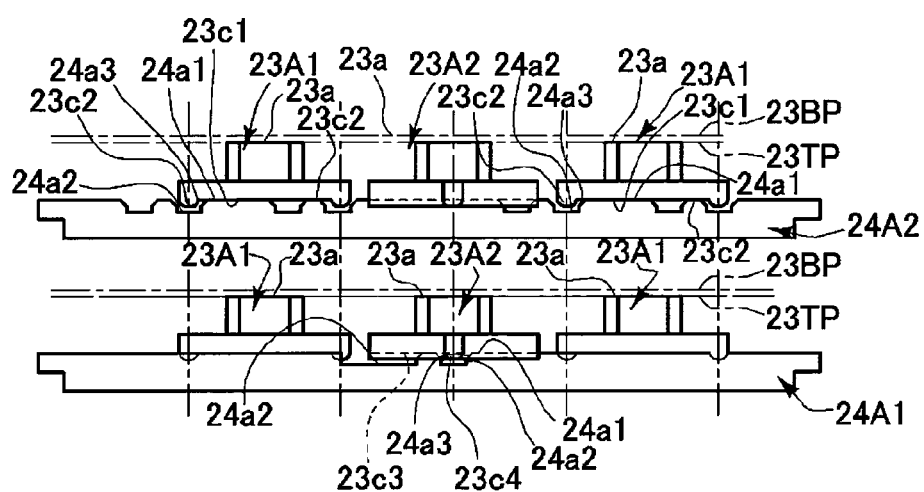
FIG. 16D is a simplified diagram showing a condition where the operation body movable parts shown in FIG. 16A are in a fourth reference stop position.
Figure 17A:
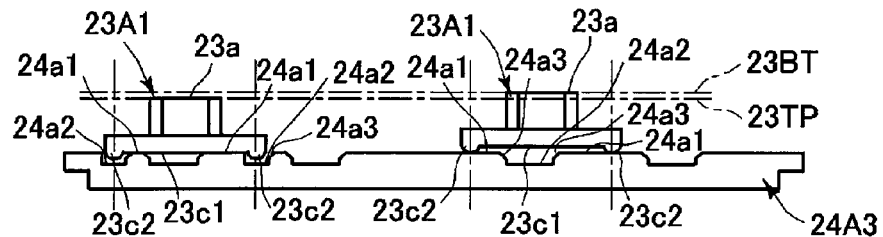
FIG. 17A is a simplified diagram showing a condition where operation body movable parts spaced from each other by a predetermined distance and mounted on one cam are in a first reference stop position.
Figure 17B:
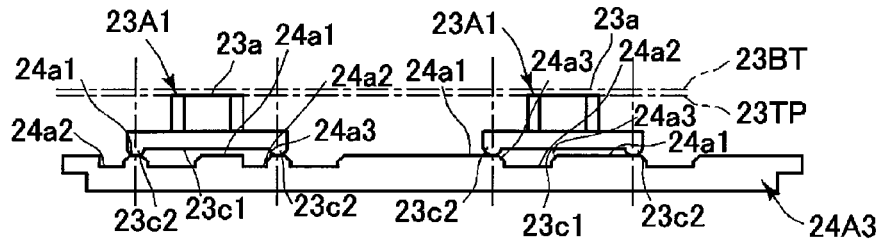
FIG. 17B is a simplified diagram showing a condition where the operation body movable parts shown in FIG. 17A are in a second reference stop position.
Figure 17C:
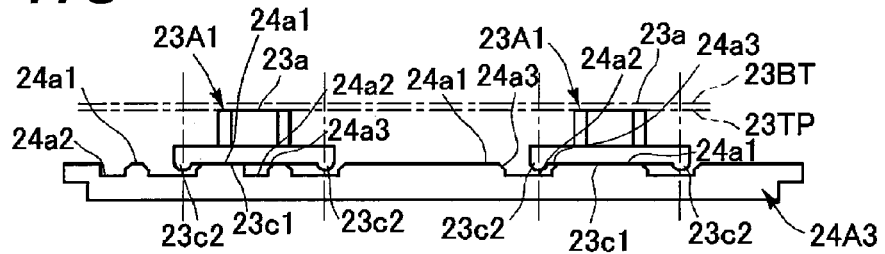
FIG. 17C is a simplified diagram showing a condition where the operation body movable parts shown in FIG. 17A are in a third reference stop position.
Figure 17D:
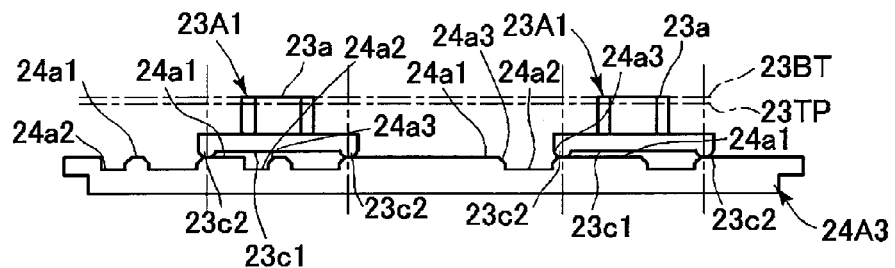
FIG. 17D is a simplified diagram showing a condition where the operation body movable parts shown in FIG. 17A are in a fourth reference stop position.
Figure 18A:
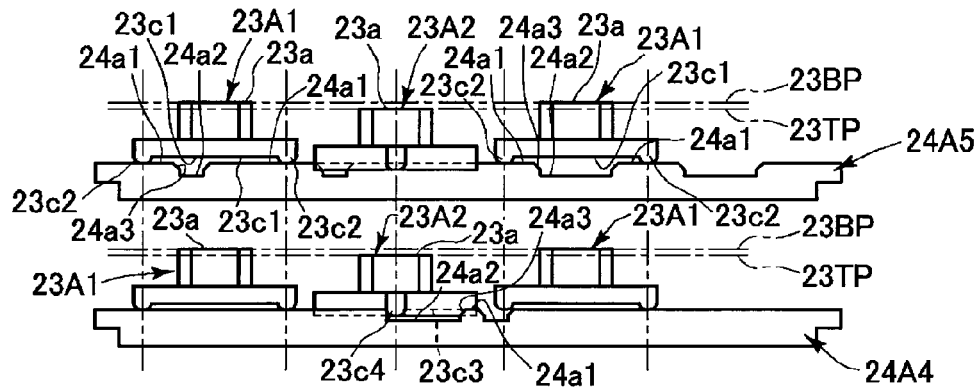
FIG. 18A is a simplified diagram showing a condition where operation body movable parts located close to each other and mounted on adjacent two cams of different types which are different from those shown in FIG. 16A are in a first reference stop position.
Figure 18B:
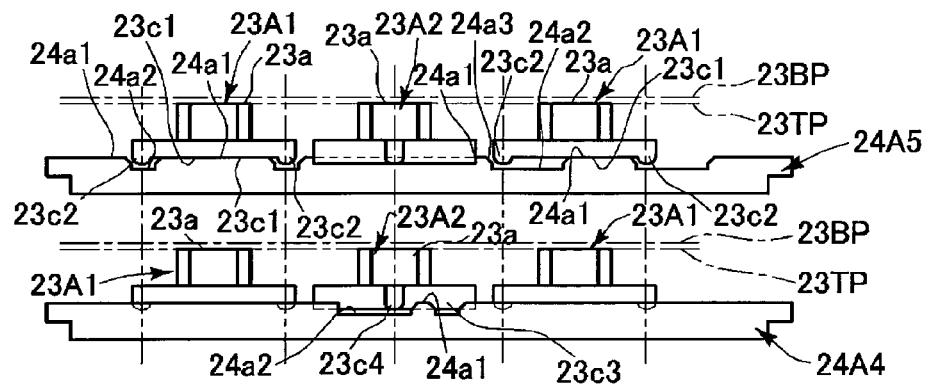
FIG. 18B is a simplified diagram showing a condition where the operation body movable parts shown in FIG. 18A are in a second reference stop position.
Figure 18C:
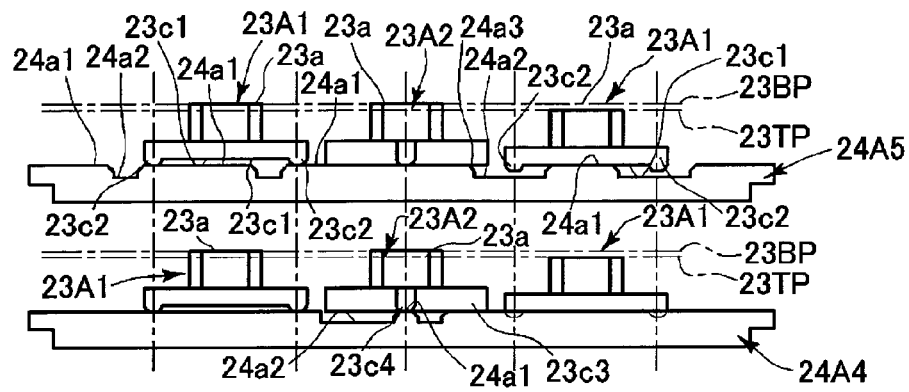
FIG. 18C is a simplified diagram showing a condition where the operation body movable parts shown in FIG. 18A are in a third reference stop position.
Figure 18D:
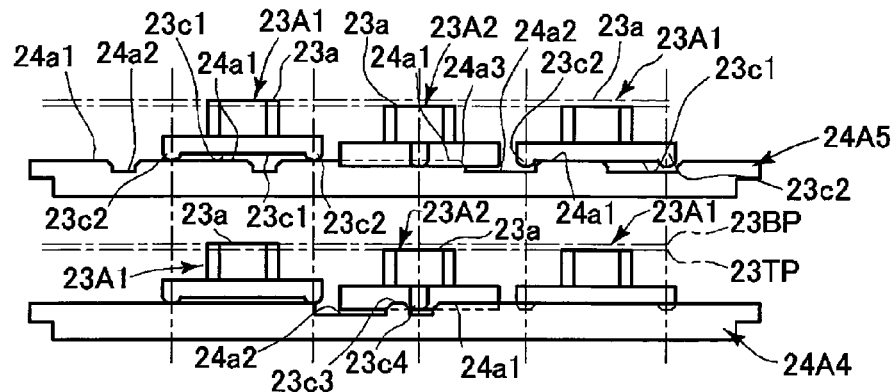
FIG. 18D is a simplified diagram showing a condition where the operation body movable parts shown in FIG. 18A are in a fourth reference stop position.

Here, there are five different types of cams 24A, and there are first to fourth reference stop positions. FIGS. 16A to 16D show reference stop positions for the operation body movable parts 23A1, 23A2, and 23A1 which are arranged close to each other and mounted on adjacent cams 24A1 and 24A2 which are different types. FIGS. 18A to 18D also show reference stop positions, which are different from those shown in FIGS. 16A to 16D, for the operation body movable parts 23A1, 23A2, and 23A1 which are arranged close to each other and mounted on adjacent cams 24A1 and 24A2 which are different types. FIGS. 17A to 17D show reference stop positions for the operation body movable parts 23A1 which are spaced from each other by a predetermined distance and mounted on one cam 24A0. Specifically, FIGS. 16A, 17A, and 18A show first reference stop positions for the operation body movable parts 23A1, 23A2, FIGS. 16B, 17B, and 18B show second reference stop positions for the operation body movable parts 23A1, 23A2, FIGS. 16C, 17C, and 18C show third reference stop positions for the operation body movable parts 23A1, 23A2, and FIGS. 16D, 17D, and 18D show fourth reference stop positions for the operation body movable parts 23A1, 23A2.

Figure 20A:
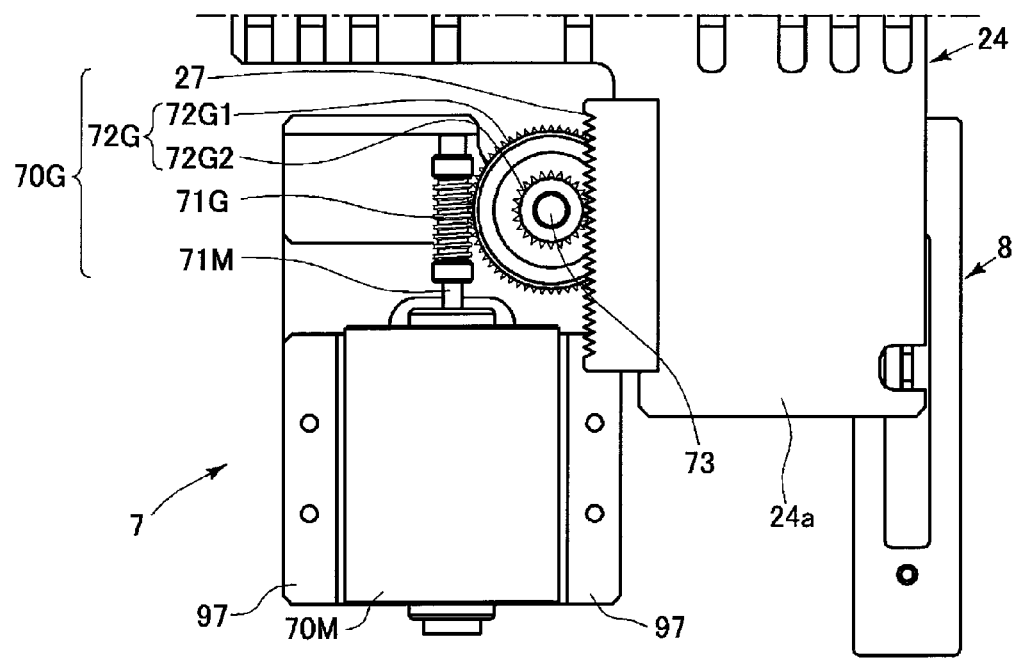
FIG. 20A is a simplified enlarged top view of the movable part driver and the drive mechanism shown in FIG. 2.

According to the present embodiment, as shown in FIG. 20A, a drive mechanism 7 or driving the movable part driver 24 includes a drive source 70M and a drive force transmitter 70G for transmitting drive force generated by the drive source 70M to the movable part driver 24 to drive the movable part driver 24. The drive force transmitter 70G transmits the drive force of the drive source 70M to the movable part driver 24 not to support the pressing operation force applied to the operation body 2 by the pressing operation applied to the touch surface 2a of the operation body 2. Here, the drive force transmitter 70G is connected so that the drive force of the drive source 70 can be transmitted in a manner capable of causing it to move relative to the movable part driver 24 in the pressing operation direction by the pressing operation to the touch surface 2a of the operation body 2.

Specifically, the drive source 70M is a motor as a rotation output means for rotating an output shaft 71M around its axis, and the drive force transmitter 70O is configured as a gear mechanism. The gear mechanism 700 receives rotation output of the drive source 70M and drives the movable part driver 24 by converting the inputted rotation output to movement force for causing the operation body movable part 23 to move between the touch surface position 23TP and the button position 23BT. The input of the rotation output of the drive source 70M and the conversion to the movement force to drive the movable part driver 24 are performed so that the drive source 70M side cannot support (non-support) the pressing operation force applied to the operation body 2 by the pressing operation to the touch surface 2a of the operation body 2.

Figure 19:
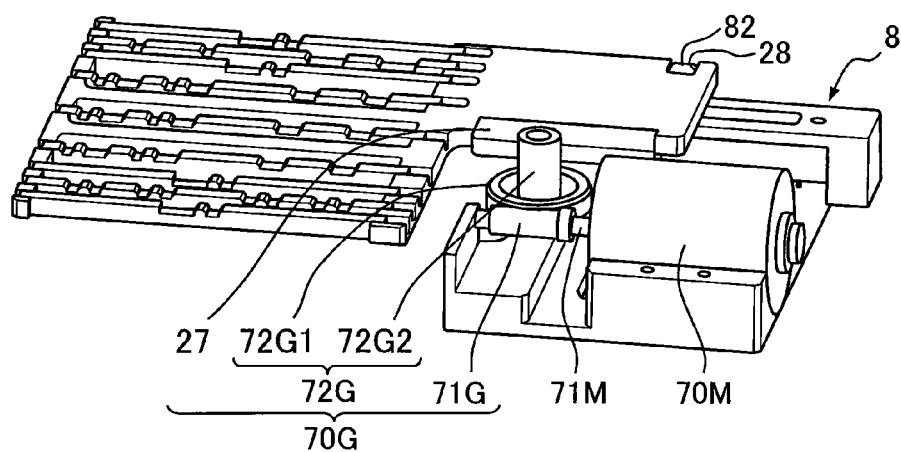
FIG. 19 is a perspective view of the movable part driver and a drive mechanism shown in FIG. 2.

According to the present embodiment, as shown in FIGS. 19 and 20A, the gear mechanism 700 includes an operation-body-side gear 27 and a drive-source-side gear 72G which mate with each other. A mating direction in which the operation-body-side gear 27 and the drive-source-side gear 72G mate with each other is perpendicular to a pressing operation direction (up-and-down direction) in which the pressing operation force is applied to the touch surface 2a. Further, the operation-body-side gear 27 and the drive-source-side gear 72G mate with each other so that when the pressing operation force is applied to the operation body 2, the operation-body-side gear 27 and the drive-source-side gear 72G can move vertically relative to each other. Specifically, a rack gear 27 as the operation-body-side gear 27 is provided to the movable part driver 24, and a pinion gear 72G2 as the drive-source-side gear 72G is included. A gear tooth extension direction of each of the rack gear 27 and the pinion gear 72G2 is the same as the operation direction in which the pressing operation force is applied to the operation body 2 by the pressing operation applied to the touch surface 2a. That is, the rack gear 27 and the pinion gear 72G2 mate with each other in a direction parallel to the touch surface 2a, and each gear tooth extension direction is the same direction as the operation direction (direction perpendicular to the touch surface 2a). Accordingly, when the operation body 2 moves down by the pressing operation force applied to the operation body 2 by the pressing operation applied to the touch surface 2a, the rack gear 27 slides in the gear tooth extension direction (here, down). Therefore, the drive-source-side gear 72G does not support the rack gear 27 which moves down.

Figure 20B:
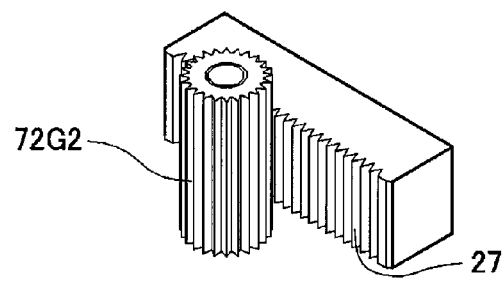
FIG. 20B is a simplified enlarged partial perspective view of the drive mechanism shown in FIG. 19.

As shown in FIG. 20B, the gear tooth width of the pinion gear 72G2 is larger than the gear tooth width of the rack gear 27. Even when the operation body 2 is displaced obliquely by the pressing operation applied to the touch surface region 23a so that the gear 27 can be displaced up and down, the mating condition with the gear 72G2 is maintained, ne the pinion gear 72G2 does not support the oblique displacement of the operation body 2.

An output shaft 71M of the motor as the drive source 70M extends horizontally, and the gear mechanism 700 is capable of rotating around its axis direction in both forward and reverse directions. The output shaft 71M is provided with a gear 71G (screw gear) capable of rotating with it. A rotation shaft 73 is provided with the gear 72 capable of rotating with it and extends in a vertical direction perpendicular to a horizontal direction. The gear 71G mates with a gear (helical gear) 72G1 of the gear 72G to form a worm gear so that the rotation around the axis of the output shaft 71M extending in the horizontal direction can be transmitted after being converted to a rotation around an axis extending in the vertical direction perpendicular to it. The gear 72G1 is on a first side in the axis direction of the gear 72. The gear 72G2 is on a second side (here, upper side) opposite to the first side of the axis direction of the gear 72. The gear 72G2 serves as the pinion gear and mates with the rack gear 27 of the movable part driver 24. Thus, the rotation of the gear 72G in the forward and reverse directions is converted to a linear reciprocating movement of the movable part driver 24.

In the gear mechanism 700, the non-support condition of the operation body 2 on the drive source 70M continues regardless of whether the operation body movable part 23 is in the touch surface position TP, in the button position BT, or in the middle position between the positions 23TP and 23TB.

Further, the motor as the drive source 70M is mounted on a motor-fixing portion 97 fixed to the bottom cover 95. A bottom plate 95a of the bottom cover 95 has an opening 95h (refer to FIG. 2) located below the drive source for ventilation. The motor-fixing portion 97 is located and fixed so that it can cross over the opening. The motor 70M is mounted on the motor-fixing portion 97 and then pressed down by a pressing member 97M so that the motor 70M can be fixed to the bottom cover 95. Here, the bottom plate 95a and the motor-fixing portion 97 are fixed together by a fastener such as a screw, and the motor-fixing portion 97 and the pressing member 97M are fixed together by a fastener such as a screw.

Further, as shown in FIGS. 6 and 7, the movable part driver 24 is inserted through the through hole 94g of the ring-shaped supporting member 94 and driven by the drive mechanism 7 so that it can performs the linear reciprocating movement in the insertion direction. The movable part driver 24 has a drive-mechanism-side projection 94X to which the operation-body-side gear 27 is provided. During the linear reciprocating movement, the drive-mechanism-side projection 94X always projects outside the through hole 94g of the supporting member 94 on the drive mechanism side 7. Here, the drive-mechanism-side projection 94X has a plate shape, and the operation-body-side gear 27 is provided on a portion of its outer surface. Further, the drive-mechanism-side projection 94X is provided on a first side of a width direction (here, direction in which the cams 24A are arranged) of the movable part driver 24 perpendicular to the linear reciprocating direction of the movable part driver 24 and is not provided on a second side opposite to it. The operation-body-side gear 27 is formed on an end surface on the first side of the drive-mechanism-side projection 94X in the width direction, and the drive source 70M and the drive transmitter 700 except the operation-body-side gear 27 are placed in a space on an adjacent second side.

Further, according to the present embodiment, it includes a position information receiver 8 for receiving a position information indicative of whether the operation body movable part 23 is in the touch surface position 23TP or in the button position 23BP and a signal processor 6 serving as a movable part driver position detector for detecting based on the position information from the position information receiver 8 whether each movable part driver 24 is in the touch surface position 23TP or in the button position. As shown in FIGS. 2 and 8, the position information receiver 8 is accommodated in the case 90.

According to the present embodiment, the position information receiver 8 detects a position of the movable part driver 24 in the linear movement direction. Here, the position information receiver 8 includes a detection axis 82 moving with the movable part driver 24 and a detection unit 81 for detecting a position of the detection axis 82 and for outputting the position information. Here, the detection axis 82 is arranged so that the movable part driver 24 can be sandwiched from both sides in the linear movement direction and moves with the movable part driver 24 in the linear movement direction when the movable part driver 24 performs the linear movement. Here, as shown in FIGS. 6 and 7, a recess 28 is formed on an end surface of the drive-mechanism-side projection 94X on the second side (opposite side to the gear 27) of the width direction (here, direction in which the cams 24A are arranged) of the movable part driver 24 perpendicular to the linear reciprocating direction of the movable part driver 24, and the detection axis 82 is placed so that it can penetrate up and down inside the recess 28.

The signal processor 6 can detect the position of the movable part driver 24 by receiving from the position information receiver 8 the position information indicative of the position of the detection axis 82. Here, there are multiple predetermined reference stop positions for the movable part driver 24, and the signal processor 6 can determine which of the touch surface position 23TP and the button position 23BP each operation body movable part 23 is in by determining which of the reference stop positions the movable part driver 24 is in. Here, the position of each movable part driver 24 and an up-and-down position (the touch surface position 23TP or the button 23BP) of the movable part driver 24 at each reference stop position are prestored in a memory of the signal processor 6 or an external memory connected to the signal processor 6, and the signal processor 6 determines based on the position information whether each movable part driver 24 is in the touch surface position 23TP or the button 23BP.

Further, according to the present embodiment, it includes an operation feeling generator 25 for generating a operation feeling when the touch operation is applied to the operation body 2 and the signal processor 6 serving as a drive control means for driving the operation feeling generator 25, when the touch operation (pressing operation) is applied to the exposed surface (touch surface region) 23a of each operation body movable part 23, to give an operation feeling corresponding to the operation.

According to the present embodiment, the operation feeling generator 25 is a vibrator, such as a solenoid, capable of generating vibration, and accommodated in the case 90. The signal processor 6 outputs a vibration command to the operation feeling generator 25 adequately at the moment of the touch operation to the touch surface region 23a, thereby giving a user (operator) an illusion that the user actually presses a button when the touch operation (pressing operation) to the operation body movable part 23 in the button position BP is performed. Thus, the operability is increased.

According to the present embodiment, the operation feeling generator 25 gives the operation feeling (here, vibration) to the operation body 2 through the supporting member 94 which supports the operation body 2 instead of giving the operation feeling (here, vibration) to the operation body 2. Specifically, as shown in FIG. 5, an operation-body-side fixing member 26 is fixed by a fastener such as a screw, fitted and in contact with a lower bottom of the through hole 94g of the ring-shaped supporting member 94, and fixed at the contact portion by a fastener such as a screw. Further, as shown in FIG. 8, a fixing portion 25z of the operation feeling generator 25 is fixed to a case-side fixing portion 95z by a fastener such as a screw. The fixing portion 25z is on a second side opposite to a first side where the operation-body-side fixing member 26 is fixed. The case-side fixing portion 95z is fixed to the bottom plate 95a by a fastener such as a screw.

According to the present embodiment, when the movable part driver 24 performs the reciprocating movement along the linear extension direction, an end of the movable part driver 24 in the linear extension direction passes through the through hole 94 of the ring-shaped supporting member 94 on each side in the linear extension direction as shown in FIGS. 5 and 6. Thus, space for movement of the movable part driver 24 is secured without loss so that space reduction can be achieved.

Further, according to the present embodiment, as shown in FIGS. 2 and 8, a push switch mechanism 5 having the push button 5a is included and accommodated in the case 90 so that the push button 5a can be exposed through the through hole 91d.

For example, the signal processor 6 (calculation means (operation position calculation means and operation force calculation means), output means (first output means, second output means), operation input acceptance means, input region type setting means) is configured as computer hardware including a conventional CPU, ROM, RAM, and a signal processing circuit such as a A/D converter. The CPU executes a control program stored in the ROM, thereby implementing a function as the operation input device 1.

For example, by executing the control program, the signal processor 6 calculates the position and force of the pressing operation force applied by the pressing operation to the touch surface 2a of the operation body 2 based on the distortion detected by each strain gauge 4 using a predetermined calculation method. Then, it is determined (operation type determination means) based on the calculation result whether an operation type of the pressing operation applied to the touch surface 2a is the pressing operation to the touch surface 2a (including the touch surface position 23TP and the touch surface 21a) except the touch surface region 23a of the operation body movable part 23 in the button position 23BT or the pressing operation to the touch surface region 23a of the operation body movable part in the button position. Then, it is determined based on the determined operation type whether an input content of the pressing operation is what is called a touch operation input (touch position input) or what is called a push button operation input (presence or absence of a button input). Specifically, when the determined type is the former pressing operation (touch operation input), the position and force of the pressing operation force are determined, and when the determined type is the latter pressing operation (push button operation input), the operation body movable part 23 located in the position where the pressing operation force is applied is determined, and also the operation force of the operation body movable part 23 to the touch surface region 23a is determined. It is noted that if generated operation force is small, the pressing operation is made invalid. Then, the determination result is outputted as the operation information (operation information output means).

Next, a calculation method for calculating the position and force of the pressing operation force applied by the pressing operation to the touch surface 2a is described.

Figure 22A:
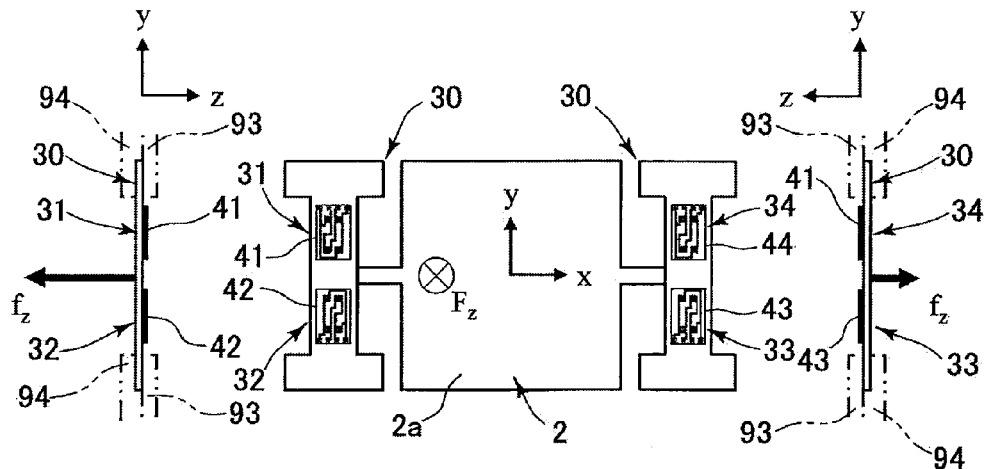
FIG. 22A is a first diagram for explaining force applied to the flexible body by a pressing operation force applied to the touch surface.
Figure 26A:
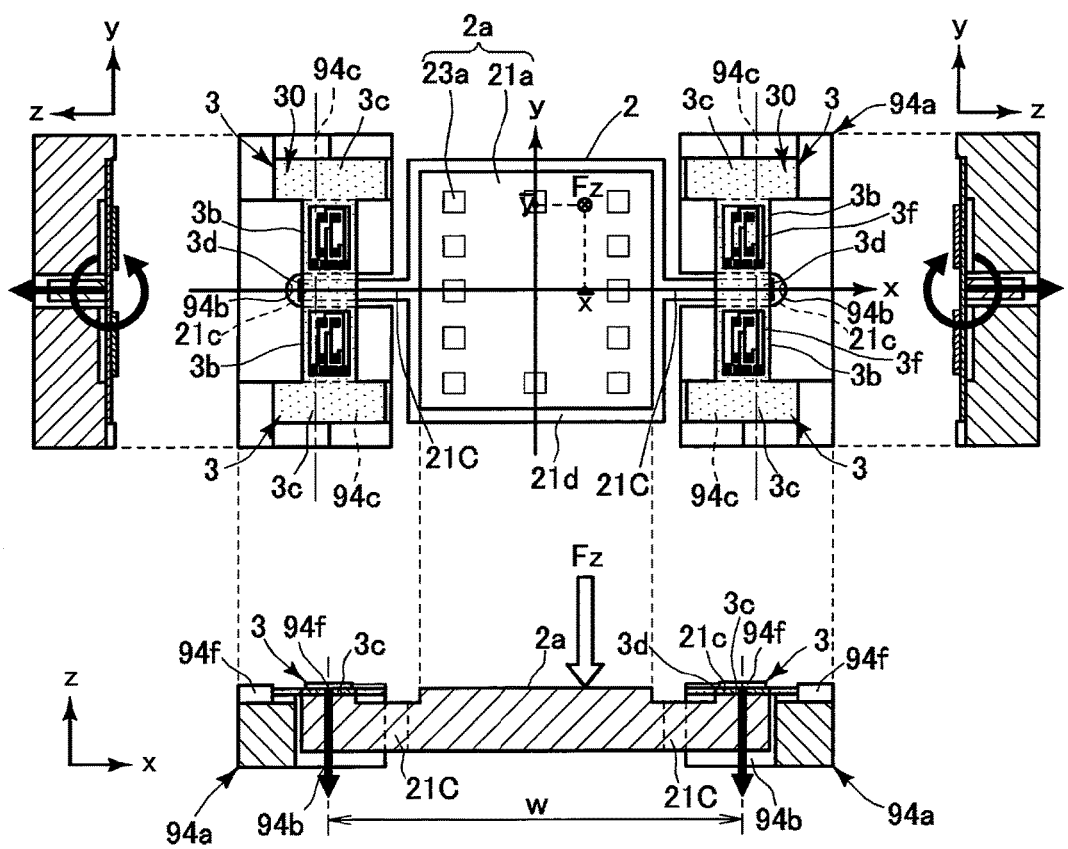
FIG. 26A illustrates (upper left) the operation body, the flexible body, and the strain gauge viewed from a left side surface to explain component force and moment applied to the left flexible body by operation force applied in a direction perpendicular to the touch surface, illustrates (upper center) the operation body, the flexible body, and the strain gauge viewed from above to explain an operation position of the operation force applied in the direction perpendicular to the touch surface, illustrates (upper right) the operation body, the flexible body, and the strain gauge viewed from a right side surface to explain component force and moment applied to the right flexible body by the operation force applied in the direction perpendicular to the touch surface, and illustrates (center) the operation body, the flexible body, and the strain gauge viewed from the front to explain the operation position of the operation force applied in the direction perpendicular to the touch surface.

As shown in FIG. 26A, when a pressing operation force Fz is applied to the touch surface 2a of the operation body 2, component forces fz1 and fz2 of the pressing operation force Fz and moment forces mz1 and mz2 are applied through the operation body 2 to the flexible body 3 fixed to the supporting member 94 (refer to FIG. 22A). However, since the flexible body 3 is arranged to connect the operation body 2 to the supporting member 94, it is forced to be deformed and bent upon application of the pressing operation force Fz. As a result, tensile stress or compression stress is applied to the displacement-transmitting surface 3f as a main surface of the flexible body 3 in its surface direction. According to the present embodiment, since the strain gauge 4 is provided on each displacement-transmitting surface 3f, the strain gauge 4 detects the amount of extension or compression of the displacement-transmitting surface 3f according to the tensile stress or the compression stress.

Figure 22B:
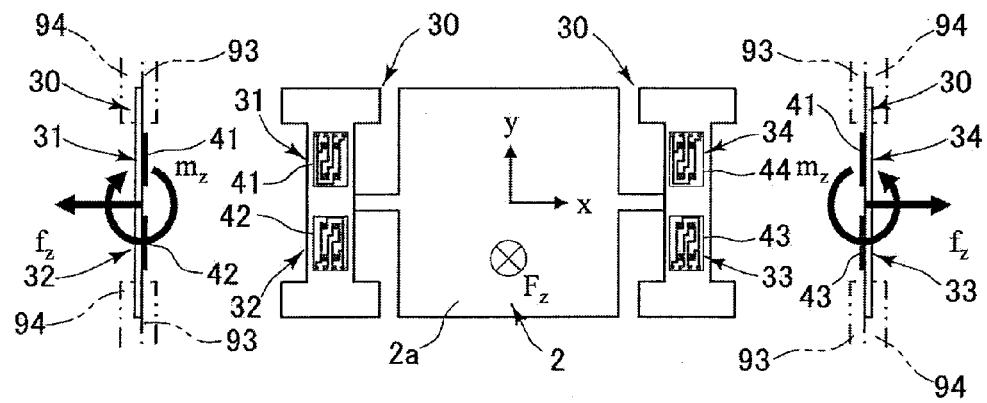
FIG. 22B is a second diagram for explaining force applied to the flexible body by a pressing operation force applied to the touch surface.

With reference to FIGS. 22A and 22B, the force applied to the flexible body 3 by the pressing operation force applied to the touch surface 2a is described.

Firstly, as shown in FIG. 22A, on the x-axis of the x-y coordinate system whose origin is at the center of the rectangular touch surface 2a, when a pressing operation force Fz is applied in a z-axis direction perpendicular to the touch surface 2a, only a force fz occurs in the flexible bodies 3 (31 to 34). Further, as shown in FIG. 22B, on the y-axis, when the pressing operation force Fz is applied in the z-axis direction perpendicular to the touch surface 2a, not only the force fz, but also a moment force mz occur in the flexible bodies 3 (31 to 34). Further, when the pressing operation force Fz is applied to a position misaligned in the x-axis direction, the forces z occurring in the left and right flexible bodies 3 (31 to 34) have different magnitudes.

In the above case, elements 4*a* to 4*d* of the strain gauges 4 (41 to 44) are arranged in a manner as shown in the left of FIG. 23. Accordingly, as shown in the right of FIG. 23, the stress applied to the displacement-transmitting surface 3*f* of the flexible body 3 becomes tensile stress or compression stress at each position of the elements 4*a*-4*d* of the strain gauge 4, and the stress varies depending on the force fz applied to the flexible bodies 331-34 and the magnitude of the moment force mz. An equivalent circuit of the strain gauge 4 is represented by a bridge circuit shown in FIG. 24B. As shown in FIG. 24A, resistances of the elements 4*a* and 4*b* where the tensile force occur decreases according to the stress, and resistances of the elements 4*c* and 4*d* where the compression force occur increases according to the stress. Therefore, the signal processor 6 can calculate the force fx and the moment force mz applied to the flexible body 3 by detecting a change in a bridge voltage Vout of the bridge circuit shown in FIG. 24B.

Figure 22C:
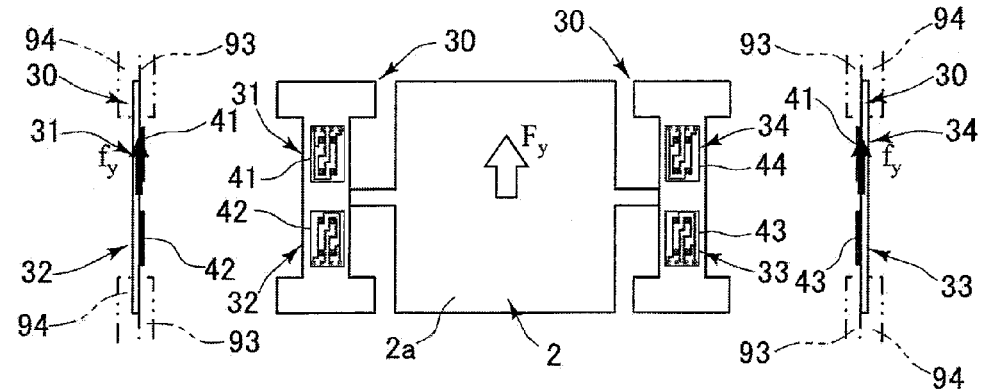
FIG. 22C is a third diagram for explaining force applied to the flexible body by a pressing operation force applied to the touch surface.
Figure 25:
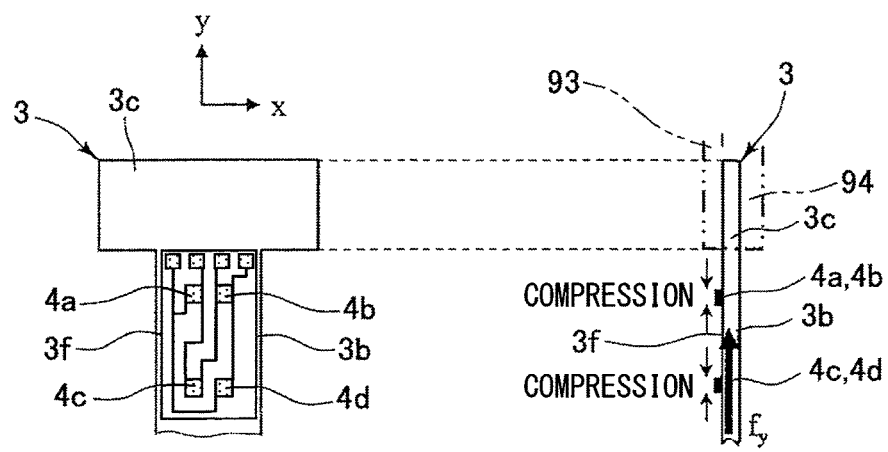
FIG. 25 illustrates the flexible body and the strain gauge viewed from above and illustrates the flexible body viewed from the side surface and showing stress applied to the displacement-transmitting surface of the flexible body when the pressing operation force is applied in a direction parallel to the touch surface.

Further, when a force Fy is applied to the operation surface in the y-axis direction, i.e., applied in the surface direction of the touch surface 2*a* as shown in FIG. 22C, each of the four elements 4*a* to 4*d* of the strain gauge 4 arranged in a manner as shown in FIG. 25A is subjected to the tensile stress or the compression stress as shown in FIG. 25B. Accordingly, no change occurs in the bridge voltage Vout of the bridge circuit shown in FIG. 24B, so that there is no sensitivity for the force in the surface direction. Therefore, the force fz applied to the flexible body 3 and the moment force mz can be calculated without consideration of the force in the surface direction.

When the pressing operation is applied to the touch surface 2*a* as shown in FIG. 26A, the signal processor (calculation means) 6 calculates the force fz (fz1, fz2) applied to the each flexible body 3 and the moment force mz (mz1, mz2) based on the bridge voltage Vout of the bridge circuit constructed with the strain gauges 4 (41 to 44), and calculates a center position, i.e., operation position (x1, y1) of the operation force Fz applied to the operation surface 2*a* based on the calculated values fz and mz and formulas (1-1), (1-2), (1-3), (1-4), and (1-5).

$$F_z = f_{z1} + f_{z2} \tag{1-1}$$

$$F_z \cdot \bar{x} = f_{z1} \cdot \frac{w}{2} - f_{z2} \cdot \frac{w}{2} \tag{1-2}$$

$$F_z \cdot \bar{y} = m_{z1} + m_{z2} \tag{1-3}$$

$$\bar{x} = \frac{f_{z1} \cdot \frac{w}{2} - f_{z2} \cdot \frac{w}{2}}{f_{z1} + f_{z2}} \tag{1-4}$$

$$\bar{y} = \frac{m_{z1} + m_{z2}}{f_{z1} + f_{z2}} \tag{1-5}$$

The formulas (1-4) and (1-5) can be derived from the formula (1-1) indicative of equilibrium of force, the formula (1-2) indicative of equilibrium of moment around the y-axis, and the formula indicative of equilibrium of force around the x-axis. It is noted that w represents distances (distances between 31, 32 and 33, 34) between center lines of the strain gauges 3 parallel to the y-axis.

When the plate-shaped displacement-transmitting surface 3*f* where the strain gauge 4 is arranged is located on the same plane as the flat touch surface 2*a* in this way, the strain gauge 4 has little sensibility except in the direction perpendicular to the touch surface 2*a* so that it can detect force only in the direction perpendicular to the touch surface 2*a*. Thus, even when the force is applied to a direction not perpendicular to the touch surface 2*a*, the center position (i.e., operation position) of gravity of the force applied to the touch surface 2*a* can be detected accurately.

Figure 26B:
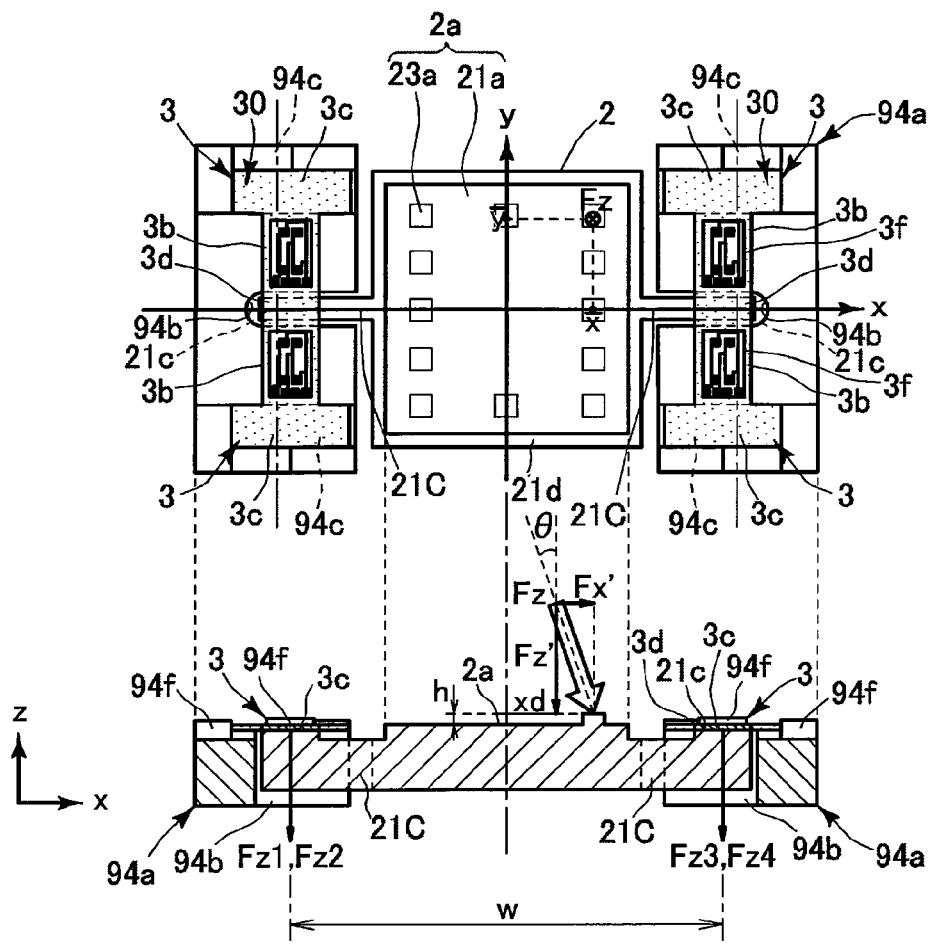
FIG. 26B illustrates (upper left) the operation body in which some operation body movable parts are in a button position, the flexible body, and the strain gauge viewed from a left side surface to explain component force and moment applied to the left flexible body by operation force applied in a direction perpendicular to the touch surface, illustrates (upper center) the operation body in which some operation body movable parts are in the button position, the flexible body, and the strain gauge viewed from above to explain an operation position of the operation force applied in the direction perpendicular to the touch surface, illustrates (upper right) the operation body in which some operation body movable parts are in the button position, the flexible body, and the strain gauge viewed from a right side surface to explain component force and moment applied to the right flexible body by the operation force applied in the direction perpendicular to the touch surface, and illustrates (center) the operation body in which some operation body movable parts are in the button position, the flexible body, and the strain gauge viewed from the front to explain the operation position of the operation force applied in the direction perpendicular to the touch surface.

Further, according to the present embodiment, the touch surface 2*a* is not always a flat surface, and a portion of the touch surface region 23*a* moves up (or moves down) so that the moved-up touch surface region 23*a* can be operated as a push button. That is, when the pressing operation is applied to the moved-up touch surface region 23*a*, the touch surface region 23*a* is not located on the same plane as the displacement-transmitting surface 3*f* of the flexible body 3. Therefore, the pressing operation force Fz needs to be calculated by taking into consideration both the force in the direction perpendicular to the surface 23*a* and the force in its surface direction. For this reason, when the pressing operation is applied to the touch surface region 23*a* as shown in FIG. 26B, it is assumed that the forth Fz is applied in a direction forming an angle θ with the direction perpendicular to the touch surface 2*a*. As a result, there arises a displacement by an amount (xd) corresponding to the angel θ from the center of gravity calculated from a conventional gravity calculation method represented by formulas (2-1) to (2-3).

$$F_z' = F_z \cdot \cos\theta = f_{z1} + f_{z2} + f_{z3} + f_{z4} \tag{2-1}$$

$$F_z \cdot \cos\theta + F_z' \cdot \sin\theta \cdot h = (f_{z3} + f_{z4}) \cdot w/2 - (f_{z1} + f_{z2}) \cdot w/2 \tag{2-2}$$

$$x + \tan\theta \cdot h = \frac{\{(f_z + f_{z4}) - (f_{z1} + f_{z2})\} \cdot w/2}{f_{z1} + f_{z2} + f_{z3} + f_{z4}} \tag{2-3}$$

Therefore, to accurately calculate the center of gravity, the displacement (xd) needs to be corrected by calculating the angle θ using another detection means, or it needs to be structured so that only a perpendicular component of the force applied to the touch surface region 23*a* can be transmitted to the flexible body 3. In either case, such additional structures may increase the cost.

However, in each operation body movable part 23, the position of the touch surface region 23*a* in the touch surface 2*a* is constant, and a height h of projection from the touch surface 2*a* at the touch surface position of the touch surface region 23*a* is constant. Therefore, there is a trend that the displacement (xd) is constant. That is, the displacement (xd) caused by the pressing operation to each touch surface region 23*a* can be obtained empirically.

Figure 26C:
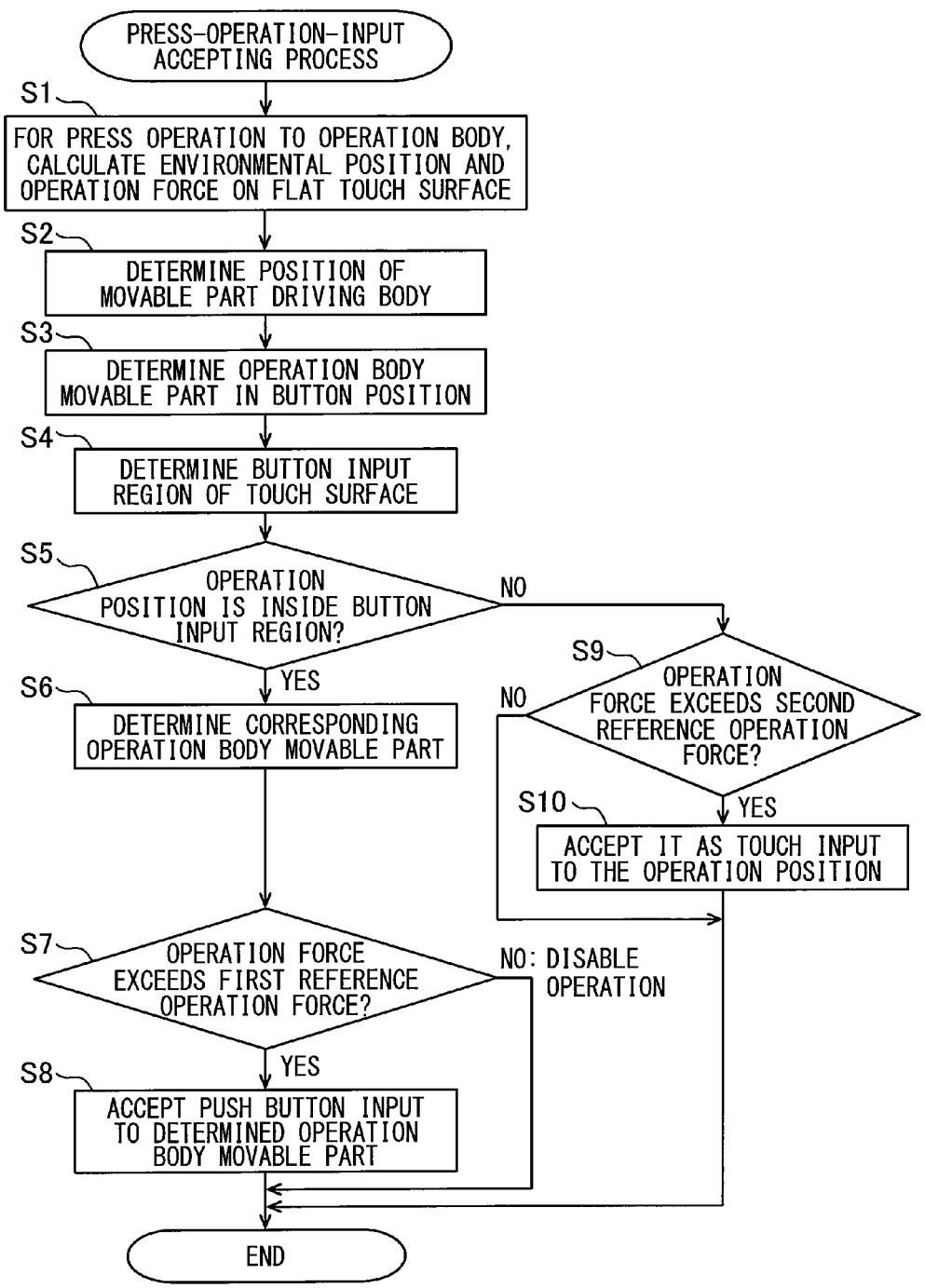
FIG. 26C is a flowchart of a pressing force operation input accept process.

Therefore, the signal processor 6 performs a pressing operation input accept process shown in FIG. 26 and described below by determining the trend of the displacement (xd) for each touch surface region 23*a* beforehand and by storing them in a memory (inside of the signal processor 6 or an external memory).

Specifically, regardless of whether the operation body movable part 23 is in the touch surface position 23TP or in the button position 23BP, when the pressing operation is applied to the touch surface 2*a* including the touch surface region 23*a* of each operation body movable part 23, the signal processor 6 calculates the position and force of the pressing operation force of the pressing operation applied to the touch surface 2*a* as a flat surface based on the distortion detected by each strain gauge 4 and the formulas (1-1) to (1-5) by assuming that all of the operation body movable parts 23 are in the touch surface position 23TP even when some of the operation body movable parts 23 are in the button position 23BP (S1).

Then, the signal processor 6 receives the position information from the position information receiver 8 and determines the position of the movable part driver 24 (S2: position information reception means and movable part driver position determination means). Then, based on the determined position of the movable part driver 24, the signal processor 6 determines which of the touch surface position 23TP and the button position 23BP each operation body movable part 23 is in (S3: operation body movable part position determination means). Further, based on the trend of the displacement (xd), the signal processor 6 determines a button input region 23b of the flat touch surface 2a. The button input region 23b is where it is determined that the pressing operation is applied to the touch surface region 23a of the operation body movable part 23 which is determined as being in the button position 23BP (S4: button input region determination means).

Then, the signal processor 6 determines whether the calculated operation position (S1) is inside the button input region 23b (S5). If it is determined that it is inside the button input region 23b (S5: Yes), the signal processor 6 determines the operation body movable part 23 corresponding to the inside of the button input region 23b (S6: input button determination means) and accepts the push button operation to the determined operation body movable part 23 (S8: operation input accept means). Here, it is accepted as the push button input only when the calculated operation force (S1) is greater than a predetermined first reference operation force (S7: Yes).

In contrast, if it is determined that it is outside the button input region 23b (S5: No), the signal processor 6 accepts the applied pressing operation as a touch operation to the remaining region 21a of the touch surface 2a or the touch surface region 23a in the touch surface position 23TP and determines the operation position in the surface 21a or 23a (S10: operation input accept means). Here, it is accepted as the touch operation only when the pressing operation force is greater than a predetermined second reference operation force smaller than the predetermined first reference operation force (S9: Yes).

As described above, according to the present embodiment, based on the distortion detected by each strain gauge 4 and the position information of the movable part driver 24, it is possible to accept both the push button operation to the operation body movable part 23 in the button position 23BP and the touch operation to the remaining region 21a of the touch surface 2a or the touch surface region 23a in the touch surface position 23TP distinctively.

Next, a concrete example of the flexible body 3 is described.

Figure 27:
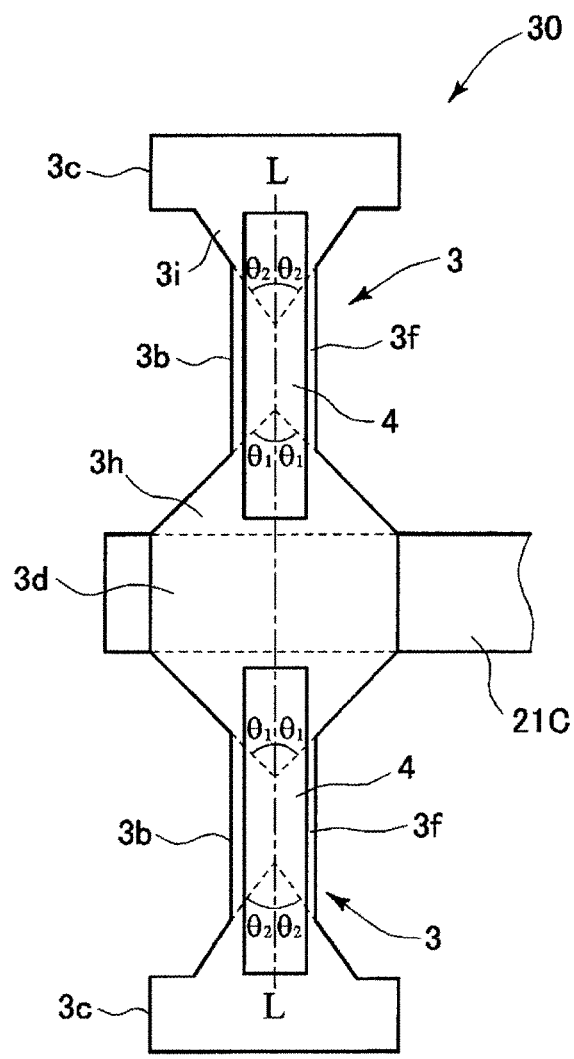
FIG. 27 is a diagram showing an example of a structure of the flexible body.

As shown in FIG. 27, the flexible body 3 has a base-side taper portion 3h, a tip-side taper portion 3i, and an extension portion 3g, and the displacement-transmitting surface 3f. The base-side taper portion 3h extends from a position where it is connected to the operation-body-side connectors 21C in a direction perpendicular to a direction in which the operation-body-side connectors 21C extends. The base-side taper portion 3h is reduced in width toward the extension tip portion (i.e., the fixing portion 3c) from the connector 3d connected to the operation-body-side connectors 21C. The tip-side taper portion 3i is reduced in width toward the connector 3d connected to the operation-body-side connectors 21C from the fixed portion 3c fixed to the supporting member 94. The extension portion 3g joins the base-side taper portion 3h to the tip-side taper portion 3i. The displacement-transmitting surface 3f is on a top surface of the extension portion 3g.

It is preferable that out of an angle formed between an outer edge of the base-side taper portion 3h and an axis L in the extension direction of the extension portion 3g, an angle θ1 on a side of the connector 3d connected to the operation-body-side connectors 21C should range from 30 degrees to 60 degrees. It is preferable that out of an angle formed between the tip-side taper portion 3i and the axis L in the extension direction of the extension portion 3g, an angle θ2 on a side of the sixing portion 3c fixed to the supporting member 94 should range from 30 degrees to 60 degrees.

Next, a screen display device for displaying an icon 100I capable of being operated by an operation to the touch surface 2a of the present disclosure is described.

Figure 28:
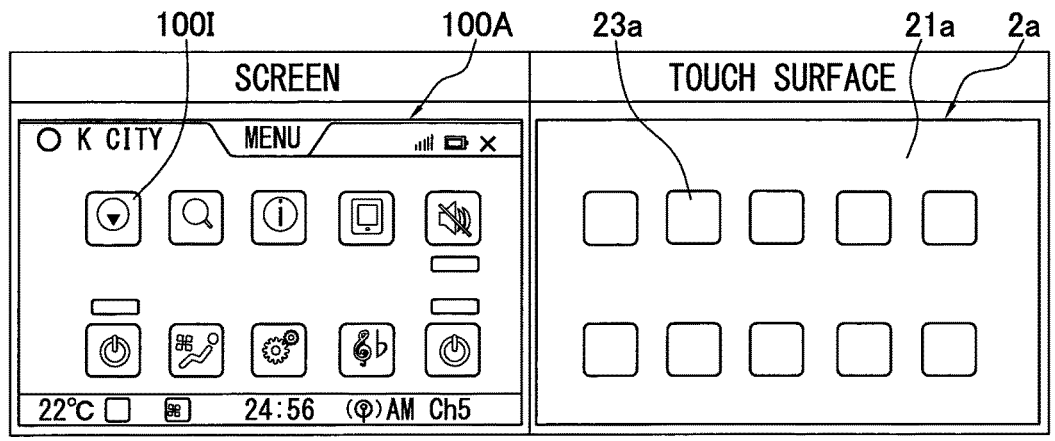
FIG. 28 illustrates a first example of a display screen of a display device working with the operation input device according to the present disclosure and a corresponding touch surface of the operation body.
Figure 29:
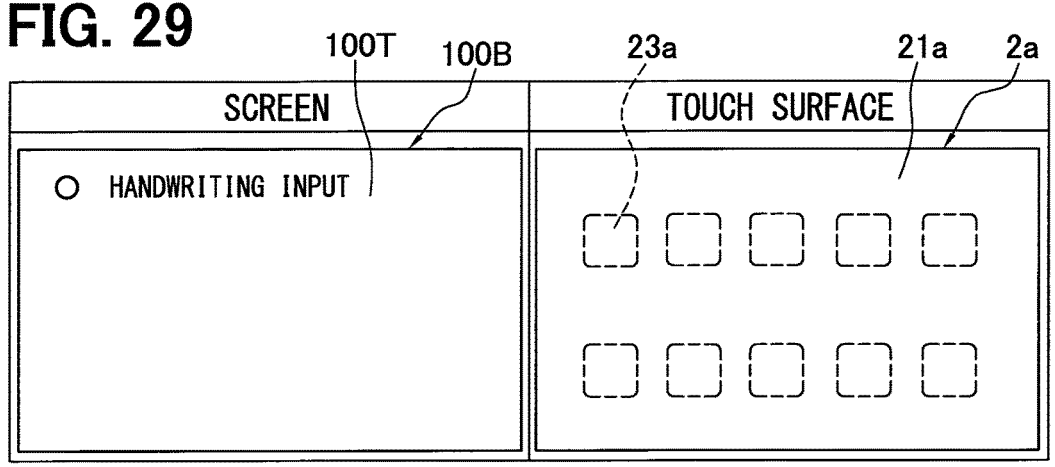
FIG. 29 illustrates a second example of the display screen of the display device working with the operation input device according to the present disclosure and a corresponding touch surface of the operation body.
Figure 30:
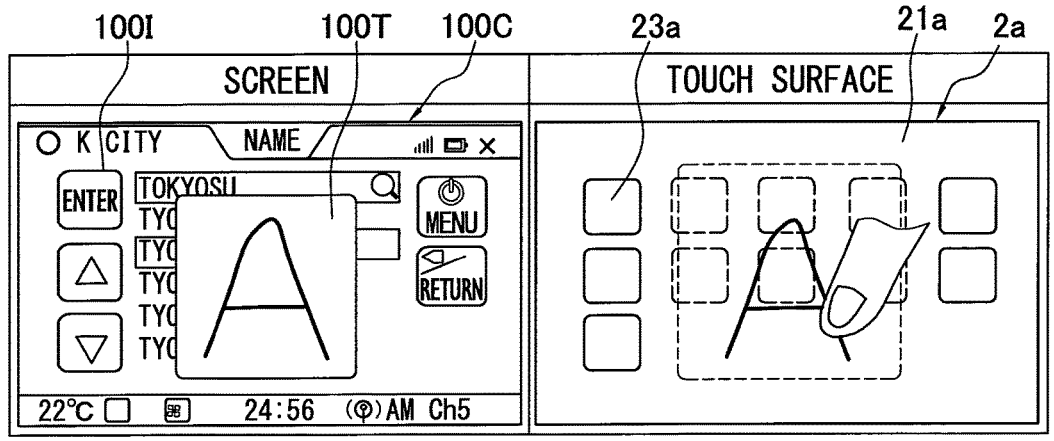
FIG. 30 illustrates a third example of the display screen of the display device working with the operation input device according to the present disclosure and a corresponding touch surface of the operation body.

The screen display device is a screen display means having a screen and includes the signal processor 6 as a screen display control means for displaying icon operation screens 100A and 100C where the icon 100I is displayed in a predetermined position as shown in FIGS. 28 and 30. The signal processor 6 causes the drive mechanism 7 to drive the movable part driver 24 according to the kind of screen to be displayed. Specifically, inside the touch surface 2a, the operation body movable part 23 is provided at a position corresponding to the icon 100I in the icon operation screens 100A and 100C. When displaying the icon operation screens 100A and 100C, the signal processor 6 causes the drive mechanism 7 to drive the movable part driver 24 so that the operation body movable part 23 corresponding to the icon 100I to be displayed can be in the button position 23BP. That is, the movable part driver 24 is moved to the reference stop position so that the operation body movable part 23 corresponding to the icon 100I to be displayed can be in the button position 23BP and that the remaining operation body movable parts 23 can be in the touch surface position 23TP. The icon operation screens 100A and 100C to be displayed include multiple screens where the operation body movable part 23 in the button position 23BP is different from the operation body movable part 23 in the touch surface position. Further, the signal processor 6 can display a touch operation screen 100B (refer to FIG. 29) where all the operation body movable parts 23 are in the touch surface position 23TP by displaying a touch region display image 100T indicating that the whole screen is a touch surface. That is, the signal processor 6 can switch an input mode of the operation input device 1 among a button input mode (FIG. 28) where only a button input to the operation body movable part 23 in the button position 23BP is accepted, a touch input mode (FIG. 29) where only a touch input to the flat touch surface 2a including the touch surface region 23a in the touch surface position 23TP is accepted, and a share mode (FIG. 30) where both the operation body movable part 23 in the button position 23BP and the operation body movable part 23 in the touch surface position 23TP are included. In the button input mode (FIG. 28), a region of the remaining touch surface 2a except the touch surface region 23a of the operation body movable part 23 in the touch surface position 23TP can be set to an input disable state so that an input by the pressing operation to the region cannot be accepted. Further, in the share mode (FIG. 30), in a button-congested region where the touch surface regions 23a of the operation body movable parts 23 in the button position 23BP are arranged close to each other, a region of the remaining touch surface 2a except the touch surface region 23a of the operation body movable part 23 in the touch surface position 23TP can be set to an input disable state so that an input by the pressing operation to the region cannot be accepted.

FIGS. 28 to 30 show a modification where the operation body movable parts 23 are arranged in a manner different from that in the present embodiment. However, the same function can be implemented also in the present embodiment by arranging the operation body movable parts 23 in the same manner as in the present embodiment and by displaying operation screens such as the operation screens 100A, 100B, and 100C where the icon (operation image) 100I and the touch region display image 100T are displayed corresponding to the position (the touch surface position and the button position) of each operation body movable part 23. By the way, the screen of the screen display device is shown in the left of FIGS. 28 to 30, and the touch surface 2a is shown in the right. Out of the operation body movable parts 23 shown in the right, the operation body movable part 23 indicated by a solid line is in the button position, and the operation body movable part 23 indicated by a broken line is in the touch surface position.

The screen display device 100 can be installed at a position in a vehicle so that a user seated on either a driver's seat or a passenger seat can operate it. For example, it can be installed at a region between a driver's seat and a passenger seat or in front of these seats from which it can be seen easily. Here, it is installed on the center console of a vehicle.

Below, embodiments different from the preceding embodiment are described. It is noted that description of the same structures as those in the preceding embodiment is omitted.

Second Embodiment

Figure 31:
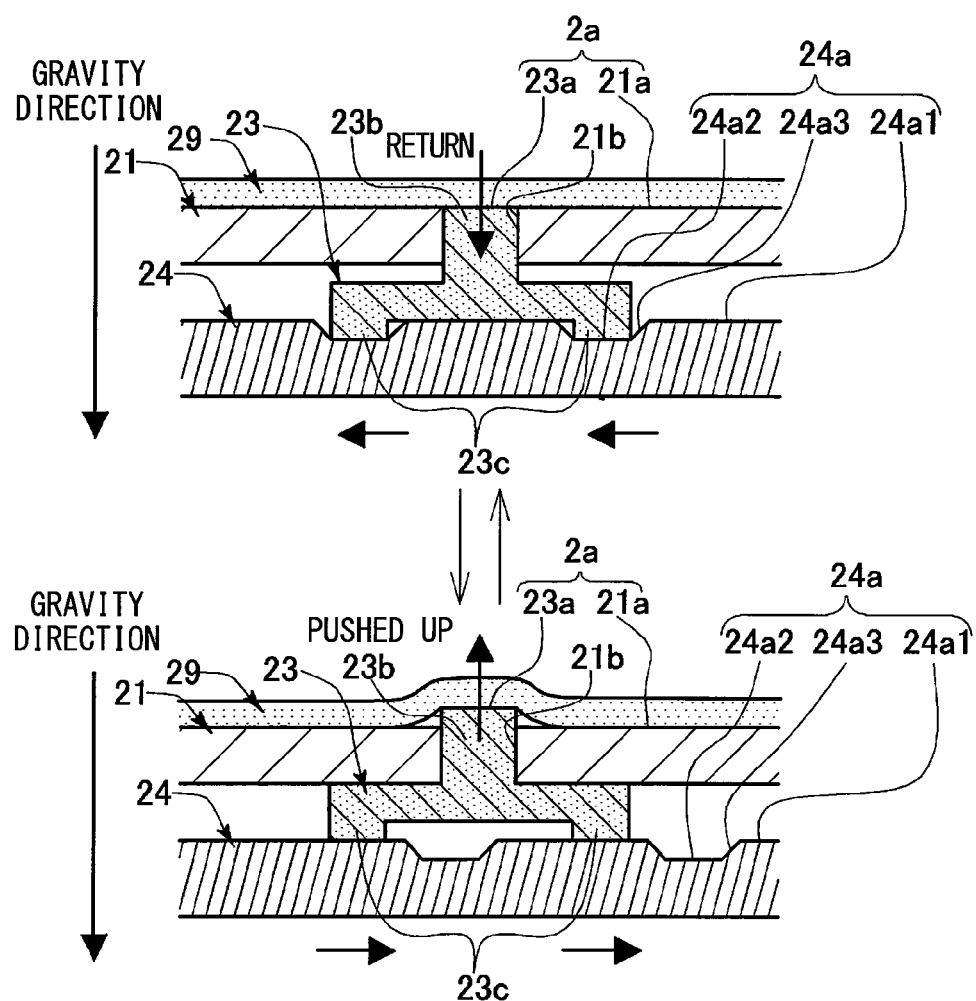
FIG. 31 is a partial cross-sectional view of an operation body of an operation input device according to a second embodiment of the present disclosure.

As shown in FIG. 31, the touch surface 2a can be covered with an elastic member 29 such as rubber. The opening 21b can be made invisible by using the elastic member 29 made of a non-transparent material, so that its design can be characterized.

Third Embodiment

Figure 32A:
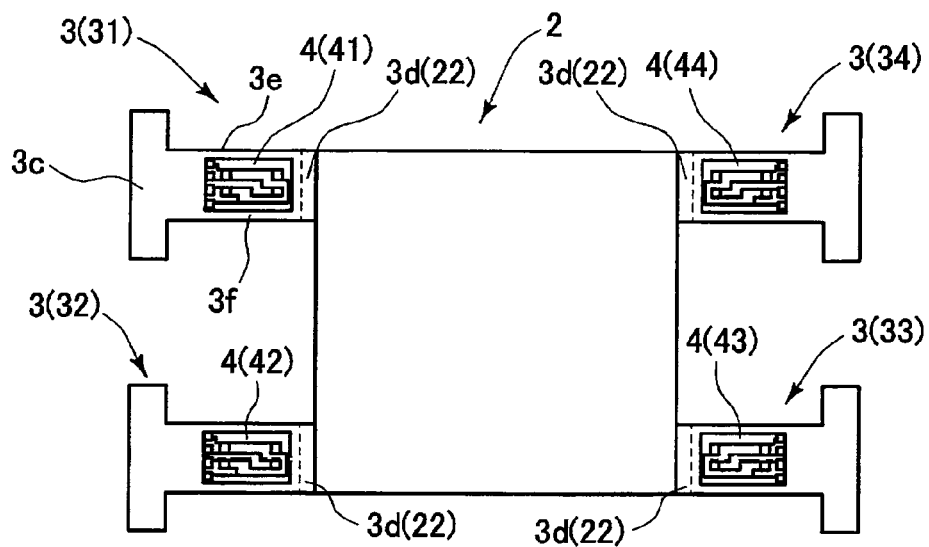
FIG. 32A is a simplified top view of an operation body and a flexible body of an operation input device according to a third embodiment of the present disclosure.
Figure 32B:
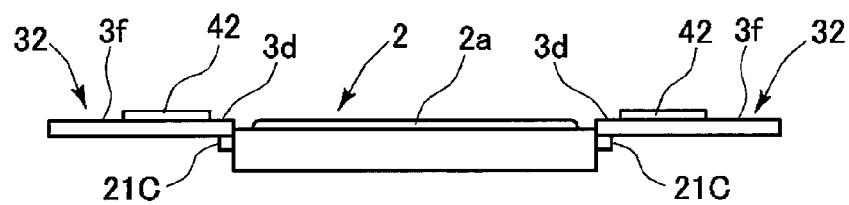
FIG. 32B is a simplified side view of the operation body and the flexible body of the operation input device according to the third embodiment of the present disclosure.

As shown in FIGS. 32A and 32B, according to the present embodiment, the flexible body 3 is attached to an operation-surface connector 22 projecting from four corners of the operation body 2 which is rectangular. That is, one flexible body is connected to one operation-surface connector. The flexible body 3 and the strain gauge 4 have the same structures as those in the first embodiment. In the structure of the first embodiment, a junction between the operation body 2 and two flexible bodies 3 is likely to be subjected to large stress. In contrast, in the present embodiment, since stress is distributed among four portions, reliability and durability of the device are improved accordingly. According to the present embodiment, all the displacement-transmitting surfaces 3f are located on the same plane as the touch surface 2a (the same is true for embodiments described later).

Fourth Embodiment

Figure 33:
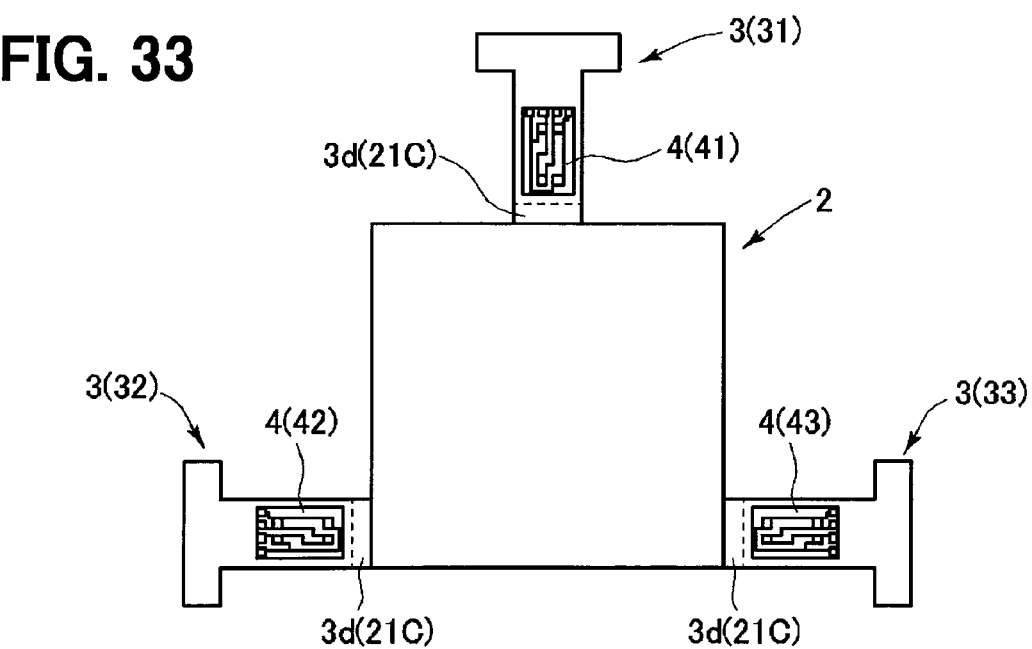
FIG. 33 is a simplified top view of an operation body and a flexible body of an operation input device according to a fourth embodiment of the present disclosure.

As shown in FIG. 33, according to the present embodiment, the number of the flexible bodies 2 shown in FIGS. 32A and 32B is reduced from four to three, and they are arranged on an outer region of the operation body 2. The center of gravity can be calculated using at least three strain gauges 4. In the present embodiment, since the number of the strain gauges is reduced, the manufacturing cost of the device is reduced accordingly.

Fifth Embodiment

Figure 34:
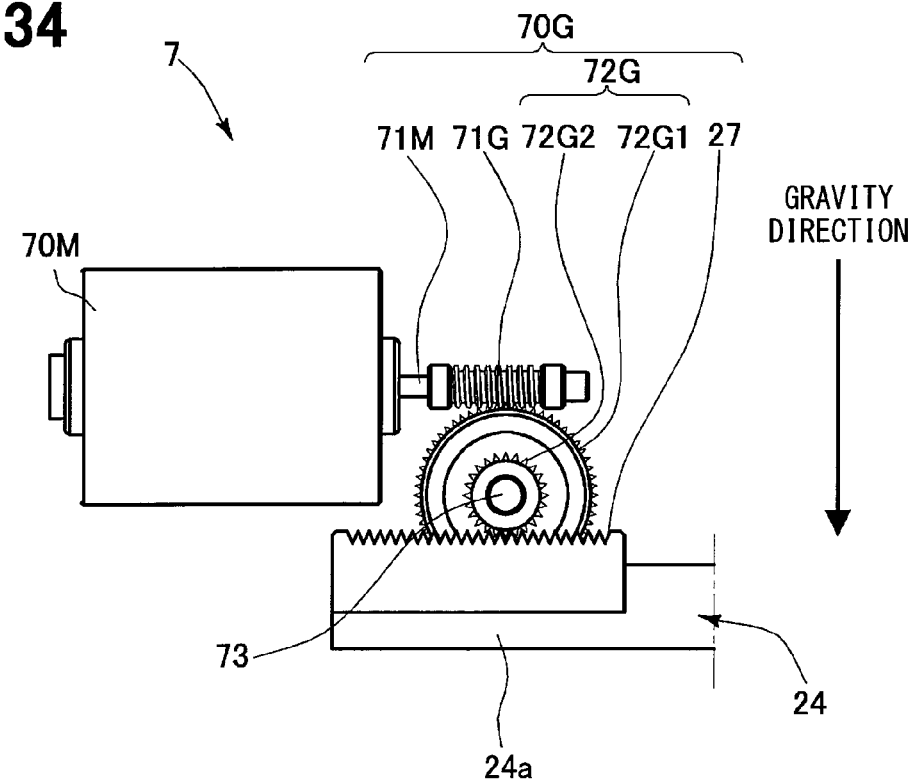
FIG. 34 is a simplified top view showing arrangement of a movable part driver and a drive mechanism according to a fifth embodiment of the present disclosure.

As shown in FIG. 34, the rack gear 27 is located below the pinion gear 72G2 so these gears 27 and 72G2 can mate with each other in the up-down direction. When the operation body 2 moves down due to the pressing operation force occurred in the operation body 2 by the pressing operation to the touch surface 2a, the rack gear 27 is separated from the pinion gear 72G2 so that the pressing operation force cannot be supported by the pinion gear 72G2. On the other hand, there is a possibility that the operation body 2 moves up. Therefore, the mating of the gears is adjusted so that the rack gear 27 cannot apply force to the pinion gear 27. For example, it is structured so that a tip of a projection of one gear tooth cannot be in contact with a bottom of a recess of the other gear tooth.

Sixth Embodiment

The drive mechanism 7 can be mounted on the movable part driver 24 so that the movable part driver 24 can move relative to the drive mechanism 7. In such an approach, even when the pressing operation force occurs in the operation body 2 by the pressing operation to the touch surface 2a, the drive mechanism 7 does not support it.

Seventh Embodiment

The first embodiment can be modified in such a manner that a difference in height between the touch surface position 23TP and the button position 23BP of the operation body movable part 23. In such an approach, the touch surface region 23a in the touch surface position 23TP of the operation body movable part 23 can substantially coincide with the button input region 23b in the button position 23BP of the operation body movable part 23. In this case, since the touch surface region 23a in the touch surface position 23TP of the corresponding operation body movable part 23 can be used as the button input region 23b, there is no need to use the trend of the displacement (xd).

While the present disclosure has been described with reference to the embodiments, it is to be understood that the disclosure is not limited to the embodiments. The present disclosure is intended to cover various modifications and equivalent arrangements inside the spirit and scope of the present disclosure.

What is claimed is:

1. An operation input device comprising:
   an operation body including an operation body movable part and a movable part driver;
   a case holding the operation body;
   at least three flexible bodies, each having a connector at one end, a fixing portion at the other end, and a middle portion between the connector and the fixing portion;
   strain gauges, and
   a processor, wherein
   the operation body movable part has a touch surface to which a user applies a pressing operation, the touch surface having a predetermined touch surface region,
   the movable part driver causes the operation body movable part to move a touch surface position where the touch surface region is flush with a remaining region of the touch surface and a button position located above or below the touch surface position, the connector is connected to an outer edge of the operation body, the fixing portion is connected to the case, the middle portion has a displacement-transmitting surface configured to be displaced according to a pressing operation force applied to the operation body by the pressing operation to the touch surface, each strain gauge is fixed to the displacement-transmitting surface of a corresponding flexible body to detect distortion of the displacement-transmitting surface caused by displacement of the flexible body, when the pressing operation is applied to the touch surface except the touch surface region of the operation body movable part in the button position, the processor calculates a position and force of the pressing operation force, and when the pressing operation force is applied to the touch surface region of the operation body movable part in the button position, the processor determines a presence of the pressing operation.

2. The operation input device according to claim 1, further comprising:

a position information reception device configured to receive position information indicative of which of the touch surface position and the button position the operation body movable part is in, wherein regardless of whether the operation body movable part is in the touch surface position or in the button position, the processor firstly calculates the position and force of the pressing operation force in the touch surface by assuming that the operation body movable part is in the touch surface position, the processor determines whether the pressing operation force is applied to the touch surface region of the operation body movable part in the button position based on the calculation result and the position information, when determining that the pressing operation force is applied to the touch surface region of the operation body movable part in the button position, the processor accepts the pressing operation force to the operation body movable part as a push button operation input, and when determining that the pressing operation force is applied to the touch surface region of the operation body movable part in the touch surface position, the processor accepts the pressing operation force to the operation body movable part as a touch operation input.

3. The operation input device according to claim 1, wherein the movable part driver is a cam mechanism having a cam in contact with the operation body movable part and causing the operation body movable part to move between the touch surface position and the button position by a movement of the cam.

4. The operation input device according to claim 3, wherein the operation body movable part is one of a plurality of operation body movable parts, and the cam causes the plurality of operation body movable parts to move between the touch surface position and the button position by moving oneself.

5. The operation input device according to claim 4, wherein the plurality of operation body movable parts is in contact with a cam surface of the cam at different positions in an extension direction of the cam, the plurality of operation body movable parts moves within a movement area of the cam while being in contact with the cam surface, and a contact section where each operation body movable part is contact with the cam surface has a touch surface position section for causing a corresponding operation body movable part to be in the touch surface position and a button position section for causing the corresponding operation body movable part to be in the button position.

6. The operation input device according to claim 5, wherein the cam is one of a plurality of cams moving in an integrated manner, and at least one of the plurality of operation body movable parts is placed on and in contact with the cam surface of each cam.

7. The operation input device according to claim 6, wherein the movement area of the plurality of cams which move in the integrated manner has a plurality of predetermined reference stop positions common to each cam, and the plurality of cams move by moving between the plurality of predetermined reference stop positions.

8. The operation input device according to claim 7, further comprising:

a cam fixing portion configured to detachably fix the plurality of cams which move in the integrated manner.

9. The operation input device according to claim 3, wherein the cam is a straight member having a cam surface extending straight, and the operation body movable part is arranged in a straight extension direction of the cam surface and in contact with the cam surface.

10. The operation input device according to claim 3, wherein the operation body has a guide portion configured to guide a movement of the cam.

11. The operation input device according to claim 3, wherein the cam is a straight member having a cam surface extending straight, at least one operation body movable part is arranged in a straight extension direction of the cam surface and in contact with the cam surface, the operation body has a guide portion configured to guide a movement of the cam, and the guide portion guides a movement of the straight member in the straight extension direction.

12. The operation input device according to claim 1, further comprising:

a drive mechanism configured to drive the movable part driver, wherein the drive mechanism includes a drive source and a drive force transmitter configured to transmit drive force generated by the drive source to the movable part driver.

13. The operation input device according to claim 12, wherein the drive force transmitter transmits the drive force of the drive source to the movable part driver in a manner not to support the pressing operation force applied to the operation body by the pressing operation force to the touch surface.

14. The operation input device according to claim 13, wherein the drive source is a rotation output device configured to rotate its output shaft around its axis, and the drive force transmitter receives an input of a rotation output of the drive source through a gear mechanism and drives the movable part driver by converting the input of the rotation output to a movement force for causing the operation body movable part to move between the touch surface position and the button position.

15. The operation input device according to claim 14, wherein the gear mechanism includes an operation-body-side gear and a drive-source-side gear which mate with each other in a direction perpendicular to a direction in which the pressing operation force is applied, and the operation-body-side gear and the drive-source-side gear mate with each other so that when the pressing operation force is applied to the operation body, the operation-body-side gear and the drive-source-side gear move relative to each other in the perpendicular direction.

\* \* \* \* \*